United States Patent
Lee et al.

(10) Patent No.: US 11,079,870 B2
(45) Date of Patent: Aug. 3, 2021

(54) DISPLAY DEVICE

(71) Applicant: Samsung Display Co., Ltd., Yongin-si (KR)

(72) Inventors: Kang Won Lee, Seoul (KR); Choon Hyop Lee, Anyang-si (KR); Sang Chul Lee, Yongin-si (KR); Seung Hwan Chung, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/596,116

(22) Filed: Oct. 8, 2019

(65) Prior Publication Data

US 2020/0201465 A1 Jun. 25, 2020

(30) Foreign Application Priority Data

Dec. 20, 2018 (KR) ........................ 10-2018-0165901

(51) Int. Cl.
*G06F 3/041* (2006.01)
*G06F 3/044* (2006.01)

(52) U.S. Cl.
CPC .......... *G06F 3/0412* (2013.01); *G06F 3/0414* (2013.01); *G06F 3/0445* (2019.05)

(58) Field of Classification Search
CPC .... G06F 1/1626; G06F 1/1643; G06F 1/1658; G06F 1/1684; G06F 3/0412; G06F 3/0414; G06F 3/0445; G06F 2203/04105; G01L 1/20; G01L 1/2281; G01L 15/00; G01L 19/0092
See application file for complete search history.

(56) References Cited

U.S. PATENT DOCUMENTS

| | | | | |
|---|---|---|---|---|
| 9,904,394 B2* | 2/2018 | Cruz-Hernandez | ..... | G06F 1/169 |
| 10,126,819 B2* | 11/2018 | Wakuda | ................ | G06F 3/0445 |
| 10,659,886 B2* | 5/2020 | Lee | ........... | G06F 1/1688 |
| 2002/0149561 A1* | 10/2002 | Fukumoto | ............... | G06F 3/016 345/156 |
| 2012/0068957 A1* | 3/2012 | Puskarich | ............... | H01L 41/37 345/174 |
| 2013/0271161 A1* | 10/2013 | Solven | ..................... | G06F 3/044 324/661 |
| 2014/0307396 A1* | 10/2014 | Lee | .......................... | H05K 1/028 361/749 |
| 2016/0218153 A1* | 7/2016 | Kim | ....................... | H01L 27/323 |
| 2017/0068368 A1* | 3/2017 | Hsiao | ..................... | G06F 3/0412 |
| 2017/0269751 A1* | 9/2017 | Cho | ......................... | G06F 3/0445 |
| 2017/0269758 A1* | 9/2017 | Wen | ....................... | G06F 3/0445 |
| 2017/0300736 A1* | 10/2017 | Song | ..................... | G06K 9/0004 |
| 2017/0357344 A1* | 12/2017 | Hong | .................... | G06F 3/0414 |
| 2017/0364192 A1* | 12/2017 | Gui | ........................ | G06F 3/044 |

(Continued)

FOREIGN PATENT DOCUMENTS

| CN | 107229368 A | * 10/2017 | ............ G06F 3/044 |
|---|---|---|---|
| KR | 2018-0090922 | 8/2018 | |
| KR | 2020-0013203 | 2/2020 | |

*Primary Examiner* — Dmitriy Bolotin
(74) *Attorney, Agent, or Firm* — H.C. Park & Associates, PLC

(57) ABSTRACT

A display device includes: a display panel; a pressure sensor disposed below the display panel, the pressure sensor configured to detect pressure applied to the display panel; and a supporting layer disposed on a surface of the pressure sensor facing away from the display panel.

19 Claims, 28 Drawing Sheets

(56) References Cited

U.S. PATENT DOCUMENTS

| | | | |
|---|---|---|---|
| 2018/0011583 A1* | 1/2018 | Gui | G06F 3/044 |
| 2018/0081482 A1* | 3/2018 | Gui | G01L 1/142 |
| 2018/0224992 A1 | 8/2018 | Hong et al. | |
| 2018/0241861 A1* | 8/2018 | Kim | H04M 1/026 |
| 2018/0260051 A1* | 9/2018 | Kim | G06F 3/0416 |
| 2018/0284935 A1* | 10/2018 | Lee | G06F 1/1656 |
| 2019/0004630 A1* | 1/2019 | Han | G06F 3/0412 |
| 2019/0043928 A1* | 2/2019 | Hong | H01L 27/323 |
| 2019/0114004 A1* | 4/2019 | Lee | G06F 3/0445 |
| 2019/0121465 A1* | 4/2019 | Seo | G06F 3/044 |
| 2019/0204959 A1* | 7/2019 | Ko | G02F 1/13338 |
| 2020/0033971 A1 | 1/2020 | Lee et al. | |
| 2020/0150845 A1* | 5/2020 | Inoue | G06F 3/0416 |
| 2020/0201465 A1* | 6/2020 | Lee | G01L 19/0092 |

\* cited by examiner

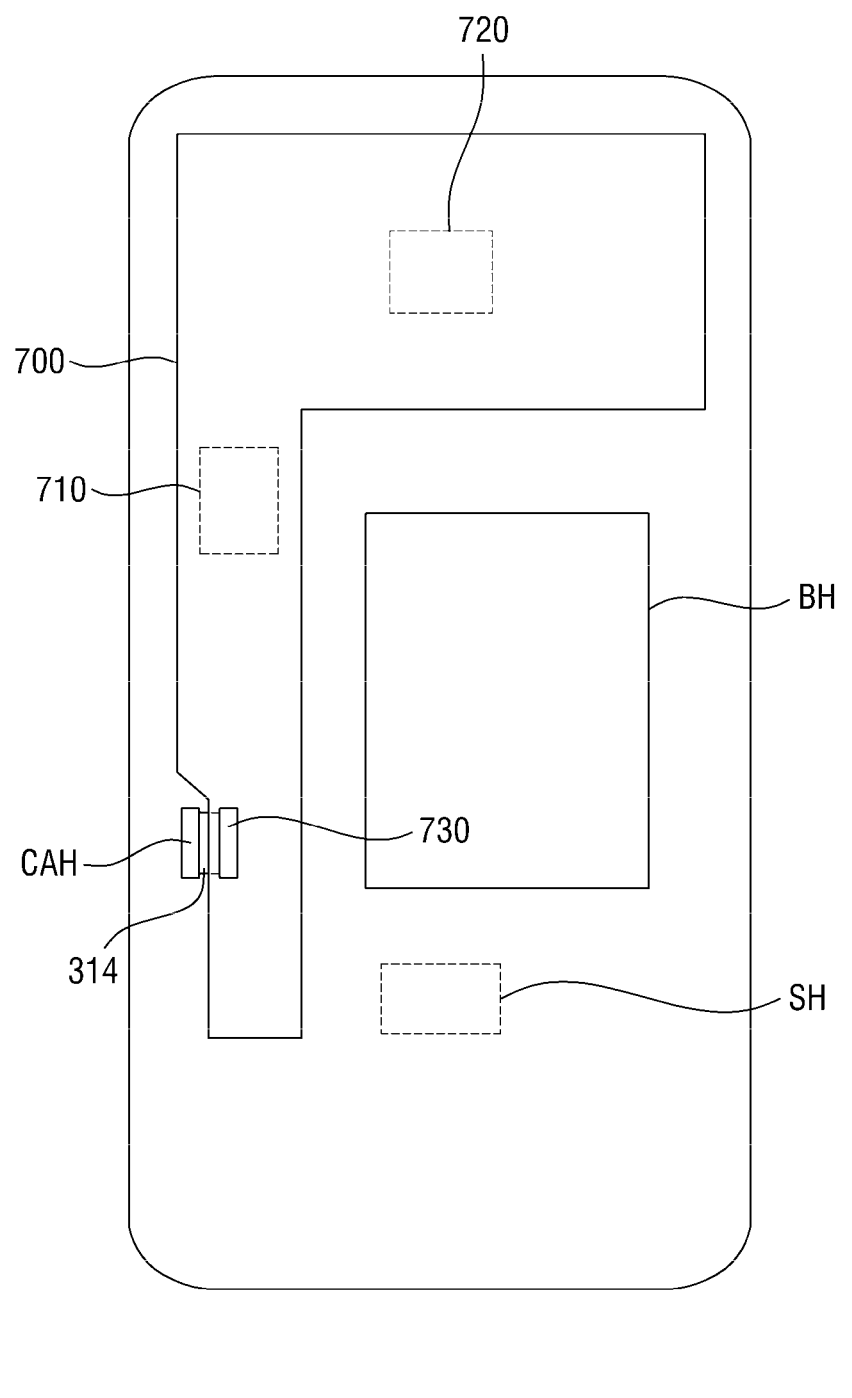
FIG. 5
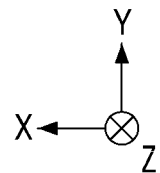

DISPLAY DEVICE

CROSS-REFERENCE TO RELATED APPLICATION

This application claims priority from and the benefit of Korean Patent Application No. 10-2018-0165901, filed on Dec. 20, 2018, which is hereby incorporated by reference for all purposes as if fully set forth herein.

BACKGROUND

Field

Exemplary implementations of the invention relate to a display device.

Discussion of the Background

An electronic device such as a smartphone, a tablet personal computer (PC), a digital camera, a notebook computer, a navigation device, or a smart television (TV) which provides an image to a user includes a display device for displaying an image. The display device includes a display panel which generates and displays an image and various input devices.

Meanwhile, touch panels capable of recognizing touch input have recently been employed in display devices such as smartphones or tablet PCs and are increasingly replacing existing physical input devices such as keypads because of their highly convenient touch method. Further, research has been conducted into ways to mount pressure sensors in display devices to realize a variety of inputs.

The above information disclosed in this Background section is only for understanding of the background of the inventive concepts, and, therefore, it may contain information that does not constitute prior art.

SUMMARY

Devices constructed according to exemplary implementations of the invention provide a display device including a pressure sensor with improved reliability.

Additional features of the inventive concepts will be set forth in the description which follows, and in part will be apparent from the description, or may be learned by practice of the inventive concepts.

According to one or more embodiments of the invention, a display device includes: a display panel; a pressure sensor disposed below the display panel, the pressure sensor configured to detect pressure applied to the display panel; and a supporting layer disposed on a surface of the pressure sensor facing away from the display panel.

The pressure sensor may be thicker than the supporting layer.

The supporting layer may have a thickness of 10 μm to 500 μm.

The pressure sensor may have a thickness of 50 μm to 250 μm.

The supporting layer may be more rigid than the pressure sensor.

The display device may further include: a middle frame disposed below the pressure sensor, the middle frame including a receiving groove, which corresponds to the pressure sensor and the supporting layer.

The display device may further include: a panel bottom member disposed between the display panel and the pressure sensor, wherein the first surface of the pressure sensor may be attached to the panel bottom member.

The receiving groove may overlap with the pressure sensor and the supporting layer in a thickness direction.

The receiving groove may include a bottom surface and side surfaces bent from the bottom surface, and the supporting layer may be spaced apart from the bottom surface in the thickness direction.

A distance between the supporting layer and the bottom surface may be 0.1 mm to 0.4 mm.

The pressure sensor may include first and second sensing cells, and the supporting layer may be disposed to overlap at least one of the first and second sensing cells.

The pressure sensor may include: a first substrate and a second substrate; a first driving electrode a second driving electrode, a first sensing electrode, and a second sensing electrode disposed on a first surface of the first substrate facing the second substrate; a first pressure sensing layer disposed on a first surface of the second substrate facing the first substrate; and a second pressure sensing layer contacting with the second driving electrode and the second sensing electrode, wherein the first pressure sensing layer may overlap with the first driving electrode and the first sensing electrode, and wherein gaps may be formed between the first pressure sensing layer and the first driving electrode and between the first pressure sensing layer and the first sensing electrode.

The second pressure sensing layer may be disposed on at least one side of the second driving electrode and on at least one side of the second sensing electrode.

The display device may further include: a waterproof member disposed between the middle frame and the panel bottom member, wherein the waterproof member may be disposed along edges of the middle frame and may be in contact with the middle frame and the panel bottom member.

According to one or more embodiments of the invention, a display device. The display device A display device includes: a display panel; a pressure sensor disposed below the display panel; a middle frame disposed below the pressure sensor; and a display circuit board attached to one side of the display panel and bent toward a bottom of the display panel to be settled in a middle frame, wherein the pressure sensor may be disposed between the display panel and the display circuit board, and wherein a first surface of the pressure sensor may be attached to the display circuit board.

The middle frame may include a receiving groove corresponding to the display circuit board, and wherein the display circuit board may be disposed in the receiving groove.

The receiving groove may include a bottom surface and side surfaces bent from the bottom surface, and wherein the display circuit board may be spaced apart from the bottom surface in a thickness direction.

The display device may further include: a panel bottom member disposed between the display panel and the pressure sensor, wherein a second surface of the pressure sensor may be attached to the panel bottom member.

The pressure sensor may include; a first substrate and a second substrate; a first driving electrode, a second driving electrode, a first sensing electrode, and a second sensing electrode disposed on a first surface of the first substrate facing the second substrate; a first pressure sensing layer disposed on a first surface of the second substrate facing the first substrate; and a second pressure sensing layer contacting with the second driving electrode and the second sensing electrode, wherein the first pressure sensing layer may overlap with the first driving electrode and the first sensing electrode, and wherein gaps may be formed between the first pressure sensing layer and the first driving electrode and between the first pressure sensing layer and the first sensing electrode.

The second pressure sensing layer may be disposed on at least one side of the second driving electrode and on at least one side of the second sensing electrode.

According to the aforementioned and other exemplary embodiments of the present disclosure, a support layer is disposed on one surface of a pressure sensor. Accordingly, the reliability of a pressure sensor can be improved, and at the same time, a pressure sensor can be used in various regions in a display device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 5 is a bottom view illustrating a middle frame and a main circuit board according to an exemplary embodiment of the present disclosure;

DETAILED DESCRIPTION

Figure 1:
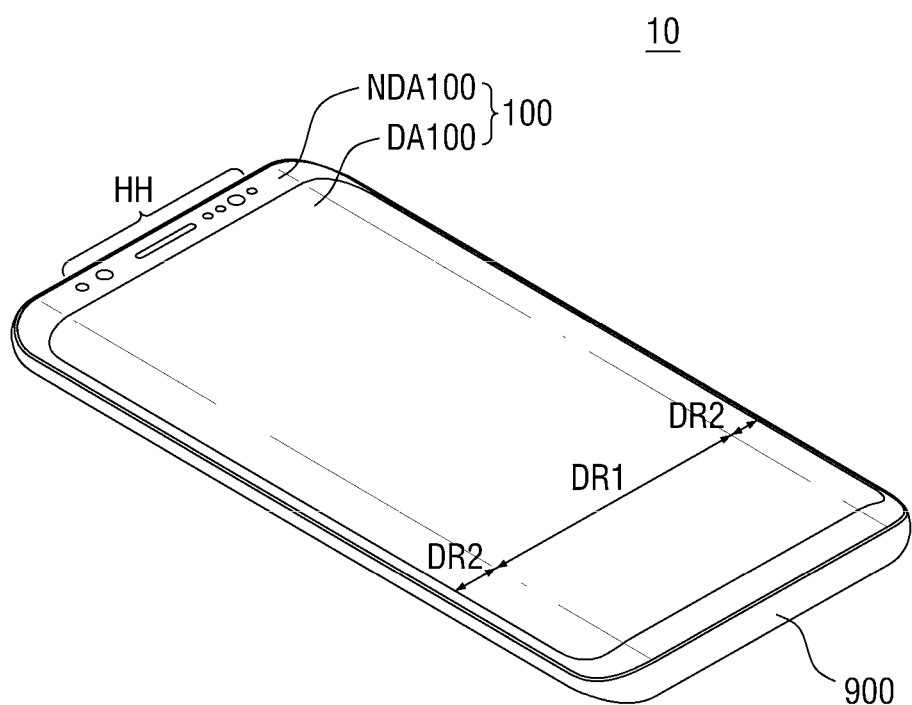
FIG. 1 is a perspective view of a display device according to an exemplary embodiment of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, an X-axis, an Y-axis, and a Z-axis are not limited to three axes of a rectangular coordinate system, such as the x, y, and z-axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Embodiments of the present disclosure will hereinafter be described with reference to the accompanying drawings.

Figure 2:
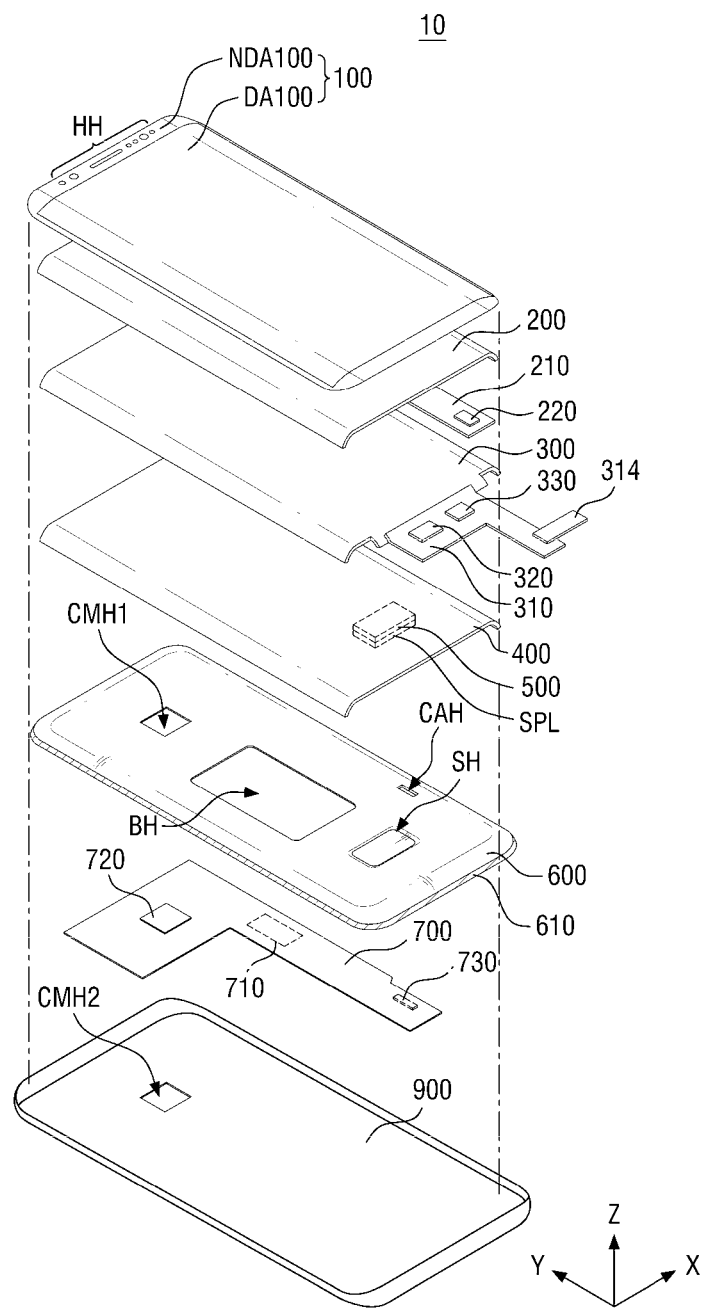
FIG. 2 is an exploded perspective view of the display device of FIG. 1.

FIG. 1 is a perspective view of a display device according to an exemplary embodiment of the present disclosure, and FIG. 2 is an exploded perspective view of the display device of FIG. 1.

Referring to FIGS. 1 and 2, a display device 10 includes a cover window 100, a touch sensing device 200, a touch circuit board 210, a touch driving unit 220, a display panel 300, a display circuit board 310, a display driving unit 320, a pressure sensing unit 330, a pressure sensor 500, a pressure sensing circuit board 550, a middle frame 600, a main circuit board 700, and a lower cover 900.

The terms "upper", "top", and "upper surface", as used herein, refer to a direction in which the cover window 100 is disposed relative to the display panel 300, i.e., a Z-axis direction, and the terms "lower", "bottom", and "lower surface", as used herein, refer to a direction in which the middle frame 600 is disposed relative to the display panel 300, i.e., the opposite direction of the Z-axis direction. Also, the terms "left", "right", "above", and "below", as used herein, refer to respective directions as the display panel 300 is viewed from above. For example, the term "left" may refer to the opposite direction of an X-axis direction, the term "right" may refer to the X-axis direction, the term "above" may refer to a Y-axis direction, and the term "below" may refer to the opposite direction of the Y-axis direction.

The display device 10 may have a rectangular shape in a plan view. For example, as illustrated in FIGS. 1 and 2, the display device 10 may have a rectangular shape with short sides extending in a first direction (or the X-axis direction) and long sides extending in a second direction (or the Y-axis direction) in a plan view. The corners at which the short sides and the long sides of the display device 10 meet may be rounded with a predetermined curvature or may be right-angled. However, the planar shape of the display device 10 is not particularly limited, and the display device 10 may have various shapes other than a rectangular shape, such as another polygonal shape, a circular shape, or an elliptical shape, in a plan view.

The display device 10 may include a first region DR1, which is flat, and second regions DR2, which extend from the left and right sides of the first region DR1. The second regions DR2 may be flat or curved. In a case where the second regions DR2 are flat, the angle that the first region DR1 and the second regions DR2 form may be an obtuse angle. In a case where the second regions DR2 are curved, the second regions DR2 may have a uniform or varying curvature.

FIG. 1 illustrates that the second regions DR2 extend from the left and right sides of the first region DR1, but the present disclosure is not limited thereto. That is, alternatively, the second regions DR2 may extend from only one of the left and right sides of the first region DR1. Still alternatively, the second regions DR2 may extend not only from the left and right sides, but also from one of the top and bottom sides of the first region DR1. In the description that follows, it is assumed that the second regions DR2 are disposed on the left and right sides of the display device 10.

Figure 9:
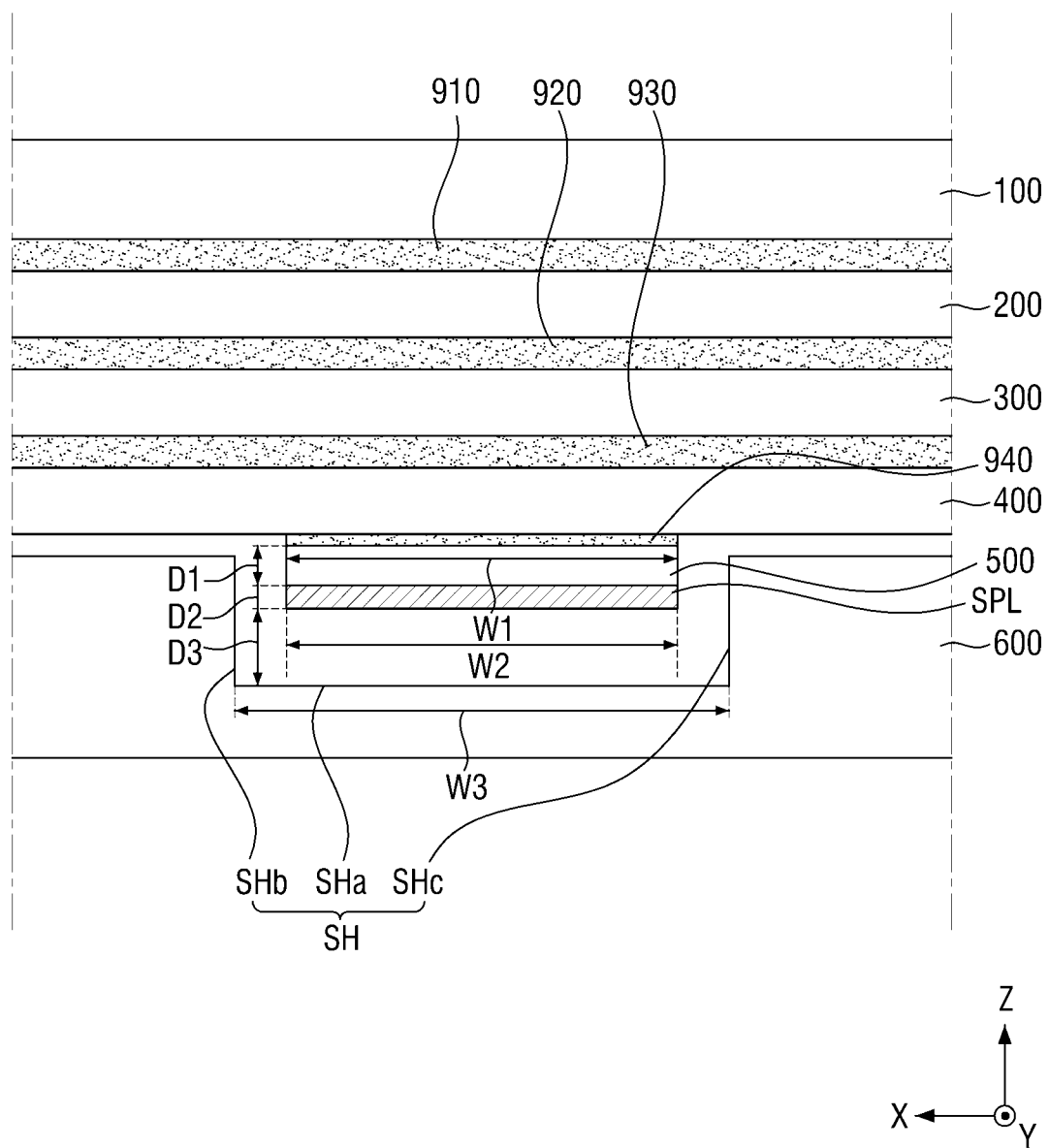
FIG. 9 is a cross-sectional view taken along sectional line I-I' of FIGS. 3 and 4.

The cover window 100 may be disposed on the display panel 300 to cover the top surface of the display panel 300. Accordingly, the cover window 100 may protect the top surface of the display panel 300. The cover window 100 may be attached to the touch sensing device 200 via a first adhesive member 910, as illustrated in FIG. 9. The first adhesive member 910 may be an optically clear adhesive (OCA) or an optically clear resin (OCR).

The cover window 100 may include a light-transmitting part DA100 corresponding to the display panel 300 and a light-blocking part NDA100 corresponding to the rest of the display device 10. The cover window 100 may be disposed in the first region DR1 and the second regions DR2. The light-transmitting part DA100 may be disposed in parts of the first region DR1 and the second regions DR2. The light-blocking part NDA100 may be opaque. The light-blocking part NDA100 may be formed as a decorative layer that may be viewed to a user when an image is not displayed. For example, a company's logo such as SAMSUNG® or a string of characters or letters may be patterned into the light-blocking part NDA100 of the cover window 100. Also, multiple holes HH for exposing a front camera, a front speaker, an infrared sensor, an iris recognition sensor, an ultrasonic sensor, and an illumination sensor may be formed in the light-blocking part NDA100, but the present disclosure is not limited thereto. For example, some or all of the front camera, the front speaker, the infrared sensor, the iris recognition sensor, the ultrasonic sensor, and the illumination sensor may be embedded in the display panel 300, in which case, some or all of the holes HH may not be provided.

The cover window 100 may be formed of glass, sapphire, and/or plastic. The cover window 100 may be rigid or flexible.

The touch sensing device 200 may be disposed between the cover window 100 and the display panel 300. The touch sensing device 200 may be disposed in the first region DR1 and the second regions DR2. Accordingly, touch input from the user can be detected not only in the first region DR1, but also in the second regions DR2.

The touch sensing device 200 may be attached to the bottom surface of the cover window 100 via the first adhesive member 910, as illustrated in FIG. 9. A polarizing film may be provided on the touch sensing device 200 to prevent or reduce the degradation of visibility, caused by the reflection of external light. In this case, the polarizing film may be attached to the bottom surface of the cover window 100 via the first adhesive member 910.

The touch sensing device 200, which is a device for detecting the location of touch input from the user, may be implemented in a capacitive manner such as a self-capacitance manner or a mutual capacitance manner. In a case where the touch sensing device 200 is implemented in the self-capacitance manner, the touch sensing device 200 includes only touch driving electrodes. On the other hand, in a case where the touch sensing device 200 is implemented in the mutual capacitance manner, the touch sensing device 200 includes touch driving electrodes and touch sensing electrodes. In the description that follows, it is assumed that the touch sensing device is implemented in the mutual capacitance manner.

The touch sensing device 200 may be formed as a panel or a film. In this case, the touch sensing device 200 may be attached to a thin-film encapsulation layer of the display panel 300 via a second adhesive member 920, as illustrated in FIG. 9. The second adhesive member 920 may be an OCA or an OCR.

Alternatively, the touch sensing device 200 may be formed in one integral body with the display panel 300. In this case, the touch driving electrodes and the touch sensing electrodes of the touch sensing device 200 may be formed on the thin-film encapsulation layer of the display panel 300.

Figure 3:
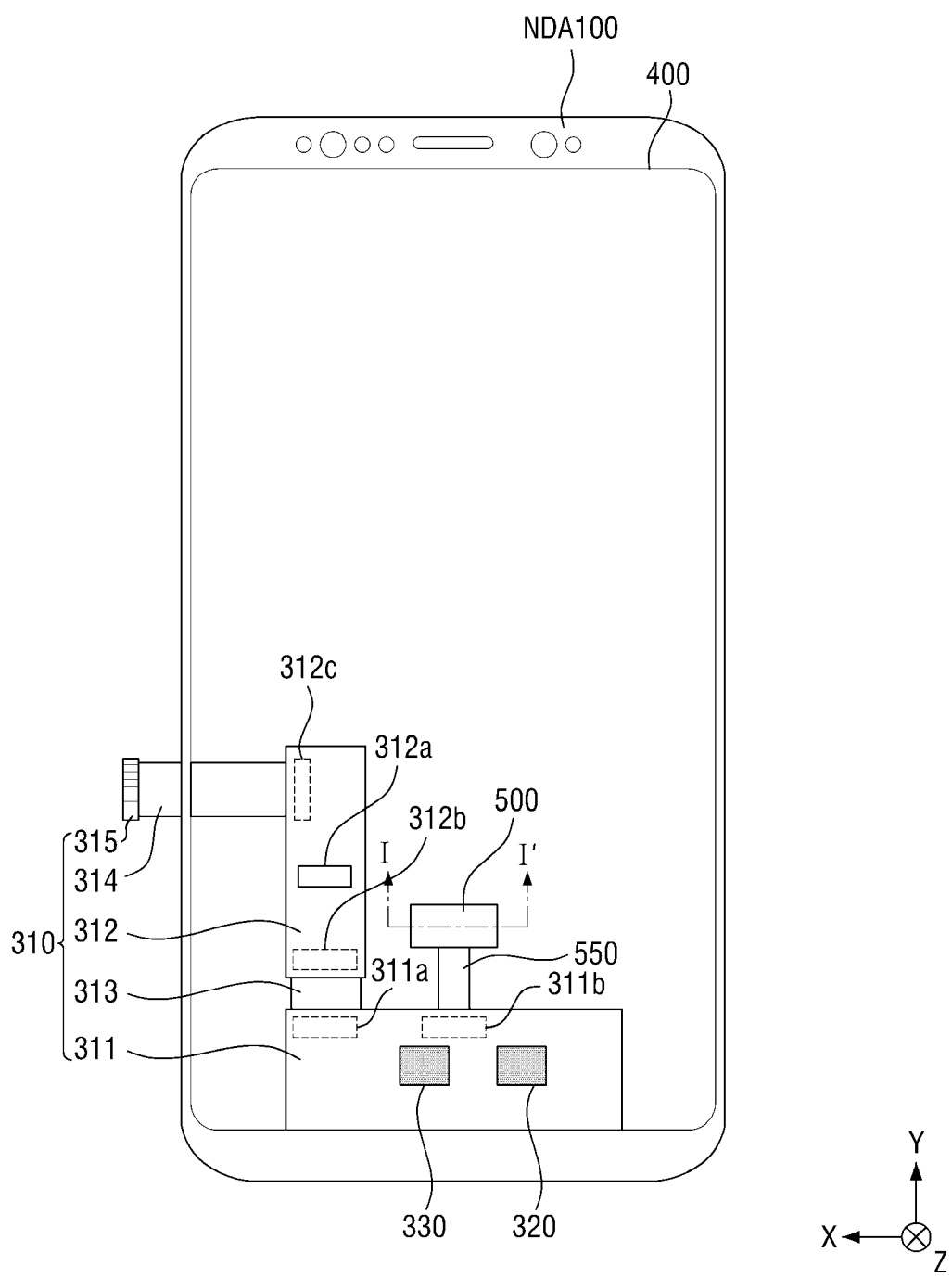
FIG. 3 is a bottom view illustrating a display panel according to an exemplary embodiment of the present disclosure.

The touch circuit board 210 may be attached to one side of the touch sensing device 200. Specifically, one side of the touch circuit board 210 may be attached on pads provided on one side of the touch sensing device 200 using an anisotropic conductive film. Also, a touch connecting part may be provided on the other side of the touch circuit board 210, and the touch connecting part may be connected to a touch connector 312a of the display circuit board 310, as illustrated in FIG. 3. The touch circuit board 210 may be a flexible printed circuit board.

The touch driving unit 220 may apply touch driving signals to the touch driving electrodes of the touch sensing device 200, may detect sensing signals from the touch sensing electrodes of the touch sensing device 200, and may calculate the location of touch input from the user by analyzing the sensing signals. The touch driving unit 220 may be formed as an integrated circuit and may be mounted on the touch circuit board 210.

The display panel 300 may be disposed below the touch sensing device 200. The display panel 300 may be disposed to overlap with the light-transmitting part DA100 of the cover window 100. Also, a side of the display panel 300 to which the display circuit board 310 is attached may be curved and may extend in a downward direction. The display panel 300 may be disposed in the first region DR1 and the second regions DR2. As a result, an image displayed by the display panel 300 may be viewed not only in the first region DR1, but also in the second regions DR2.

The display panel 300 may be a light-emitting display panel including light-emitting elements. For example, the display panel 300 may be an organic light-emitting diode (OLED) display panel using OLEDs, a micro light-emitting diode (mLED) display panel using mLEDs, or a quantum-dot light-emitting diode (QLED) display panel using QLEDs.

The display panel 300 may include a substrate, a thin-film transistor (TFT) layer disposed on the substrate, a light-emitting element layer, and a thin-film encapsulation layer.

The display panel 300 may be formed of plastic and may thus be flexible. In this case, the substrate may include a flexible substrate and a supporting substrate. The supporting substrate, which is for supporting the flexible substrate, may be less flexible than the flexible substrate. The flexible substrate and the supporting substrate may include a polymer material with flexibility. For example, the flexible substrate and the supporting substrate may include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), or a combination thereof.

The TFT layer is disposed on the substrate. The TFT layer may include scan lines, data lines, and TFTs. Each of the TFTs includes a gate electrode, a semiconductor layer, and source and drain electrodes. In a case where a scan driver is formed directly on the substrate, the scan driver may be formed together with the TFT layer.

The light-emitting element layer is disposed on the TFT layer. The light-emitting element layer includes anode electrodes, a light-emitting layer, a cathode electrode, and banks. The light-emitting layer may include an organic light-emitting layer including an organic material. For example, the light-emitting layer may include a hole injection layer, a hole transport layer, an organic light-emitting layer, an electron transport layer, and an electron injection layer. The hole injection layer and the electron injection layer may not be provided. In response to voltages being applied to the anode electrodes and the cathode electrode, holes and electrons may move to the organic light-emitting layer through the hole transport layer and the electron transport layer, respectively, and may be combined together in the organic light-emitting layer to emit light. The light-emitting element layer may be a pixel array layer in which pixels are formed, and as a result, a region in which the light-emitting element layer is formed may be defined as a display area in which an image is displayed. An area peripheral to the display rea may be defined as a non-display area.

The thin-film encapsulation layer is disposed on the light-emitting element layer. The thin-film encapsulation layer prevents or limits oxygen or moisture from infiltrating into the light-emitting element layer. The thin-film encapsulation layer may include at least one inorganic film and at least one organic film.

The display circuit board 310 may be attached to one side of the display panel 300. Specifically, one side of the display circuit board 310 may be attached to pads provided on one side of the display panel 300 via an anisotropic conductive film. The display circuit board 310 may be bent toward the bottom surface of the display panel 300. The touch circuit board 210 may also be bent toward the bottom surface of the display panel 300. As a result, the touch connecting part, which is disposed at an end of the touch circuit board 210, may be connected to the touch connector 312a of the display circuit board 310. The display circuit board 310 will be described later in detail with reference to FIGS. 3 and 4.

The display driving unit 320 outputs signals and voltages for driving the display panel 300 via the display circuit board 310. The display driving unit 320 is formed as an integrated circuit and may be mounted on the display circuit board 310, but the present disclosure is not limited thereto. For example, the display driving unit 320 may be mounted directly on the substrate, in which case, the display driving unit 320 may be attached on the top surface or the bottom surface of the substrate.

A panel bottom member 400 may be disposed below the display panel 300, as illustrated in FIG. 9. The panel bottom member 400 may be attached to the bottom surface of the display panel 300 via a third adhesive member 930. The third adhesive member 930 may be an OCA or an OCR.

The panel bottom member 400 may include at least one of a light-absorbing member for absorbing external light incident thereupon, a buffer member for absorbing external impact, a heat dissipation member for effectively releasing heat, and a light-shielding layer for blocking external light incident thereupon.

The light-absorbing member may be disposed below the display panel 300. The light-absorbing member blocks the transmission of light and thus prevents or protects the elements disposed therebelow, such as the pressure sensor 500, the display circuit board 310, and the like, from becoming visible from above the display panel 300. The light-absorbing member may include a light-absorbing material such as a black pigment or dye.

The buffer member may be disposed below the light-absorbing member. The buffer member absorbs external impact and thus prevents or protects the display panel 300 from being damaged. The buffer member may be formed as a single- or multilayer film. For example, the buffer member may be formed of a polymer resin such as PU, PC, polypropylene (PP), or polyethylene (PE) or may include an elastic material such as a sponge obtained by foam-molding rubber, a urethane material, or an acrylic material. The buffer member may be a cushion layer.

The heat dissipation member may be disposed below the buffer member. The heat dissipation member may include a first heat dissipation layer including graphite or carbon nanotubes or a second heat dissipation layer including a film of a metal with excellent thermal conductivity such as copper (Cu), nickel (Ni), ferrite, or silver (Ag).

The pressure sensor 500 may be disposed below the panel bottom member 400, as illustrated in FIG. 9. The pressure sensor 500 may be attached to the bottom surface of the panel bottom member 400 via a fourth adhesive member 940. The fourth adhesive member 940 may be an OCA or an OCR.

The pressure sensor 500 may be disposed in the first region DR1 and may be used as a physical button such as a home key, but the present disclosure is not limited thereto. Alternatively, the pressure sensor 500 may be disposed in the second regions DR1 and may be used as a physical button such as a sound key.

A supporting layer SPL may be disposed on one surface of the pressure sensor 500. For example, the supporting layer SPL may be disposed on the bottom surface of the pressure sensor 500. The supporting layer SPL is formed of a more rigid material than the pressure sensor 500 and can thus concentrate pressure applied vertically to the cover window 100 along the opposite direction of a third direction (i.e., along the opposite direction of a Z-axis direction) upon the pressure sensor 500. Due to the presence of the supporting layer SPL, the pressure sensor 500 can detect pressure even when the bottom surface of the pressure sensor 500 is not fixed to the middle frame 600. The top surface of the pressure sensor 500 is defined as being a surface that is fixed to the fourth adhesive member 940, and the bottom surface of the pressure sensor 500 is defined as being a surface that faces the middle frame 600.

As illustrated in FIG. 3, the pressure sensor 500 may be connected to the display circuit board 310 via the pressure sensing circuit board 550, and the pressure sensing unit 330, which is for detecting pressure by driving the pressure sensor 500, may be mounted on the display circuit board 310. In this case, the pressure sensing unit 330 may be formed as an integrated circuit. In some embodiments, the pressure sensing unit 330 and the display driving unit 320 may be integrated into a single integrated circuit.

In some embodiments, the pressure sensing circuit board 550 may be connected to the touch circuit board 210, rather than to the display circuit board 310. In this case, the pressure sensing unit 330 may be mounted on the touch circuit board 210. In some embodiments, the pressure sensing unit 330 and the touch driving unit 220 may be integrated into a single integrated circuit.

The middle frame 600 may be disposed below the panel bottom member 400. The middle frame 600 may include a synthetic resin, a metal, or both.

A receiving groove SH is disposed in the middle frame 600 to correspond to the pressure sensor 500, and the pressure sensor 500 is disposed in the receiving groove SH of the middle frame 600. For example, the supporting layer SPL and parts of the bottom surface and side surfaces of the pressure sensor 500 are disposed in the receiving groove SH, but the present disclosure is not limited thereto. Alternatively, only the supporting layer SPL may be disposed in the receiving groove SH, or the supporting layer SPL and the entire bottom surface and all the sides of the pressure sensor 500 may be disposed in the receiving groove SH.

The receiving groove SH may have a larger area than the pressure sensor 500. Also, the receiving groove SH may be formed to have a shape corresponding to the shape of the pressure sensor 500, but the present disclosure is not limited thereto. That is, the receiving groove SH may be formed in various shapes that can properly receive the pressure sensor 500. The bottom surface of the receiving groove SH that faces the supporting layer SPL may be a predetermined distance apart from the supporting layer SPL, which is disposed on the bottom surface of the pressure sensor 500, in the third direction (or the Z-axis direction). Accordingly, damage to, and the malfunction of, the pressure sensor 500 that may be caused by mechanical tolerances when the pressure sensor 500 is placed in contact with the panel bottom member 400 and the middle frame 600 can be prevented or reduced.

In some embodiments, a first camera hole CMH1, in which a camera device 720 is inserted, a battery hole BH, which is for dissipating heat generated by a battery, and a cable hole CAH, which is passed through by a second connection cable 314 connected to the display circuit board 310, may be disposed in the middle frame 600.

A waterproof member may be disposed along the edges of the middle frame 600. The waterproof member may be attached to the top surface of the panel bottom member 400 and the bottom surface of the middle frame 600 and may prevent or limit moisture or dust from penetrating between the display panel 300 and the middle frame 600. That is, a display device 10 that is waterproof and dustproof can be provided.

The main circuit board 700 may be disposed below the middle frame 600. The main circuit board 700 may be a printed circuit board or a flexible printed circuit board.

The main circuit board 700 may include a main processor 710, the camera device 720, and a main connector 730. The main processor 710 and the main connector 730 may be disposed on the bottom surface of the main circuit board 700 that faces the lower cover 900. Also, the camera device 720 may be disposed on both the top surface and the bottom surface of the main circuit board 700.

The main processor 710 may control all the functions of the display device 10. For example, the main processor 710 may output image data to the display driving unit 320 so that the display panel 300 can display an image. Also, the main processor 710 may receive touch data from the touch driving unit 220, may determine the location of touch input from the user, and may execute an application pointed to by an icon displayed at the location of the touch input from the user. Also, the main processor 710 may receive pressure sensing data from the touch driving unit 220 or the pressure sensing unit 330 and may execute an application pointed to by an icon displayed at the location of pressure input from the user based on the pressure sensing data. Also, the main processor 710 may cause a vibration generation device to vibrate in accordance with pressure sensing data and may thus control a haptic effect to be realized. The main processor 710 may be an application processor, a central processing unit, or a system chip that consists of an integrated circuit.

The camera device 720 processes image frames (such as still or moving image frames) obtained by an image sensor in a camera mode and outputs the processed image frames to the main processor 710.

The second connection cable 314, which passes through the cable hole CAH of the middle frame 600, may be connected to the main connector 730, which is disposed on the bottom source of the main circuit board 700 through the gap between the middle frame 600 and the main circuit board 700. As a result, the main circuit board 700 can be electrically connected to the display circuit board 310 and the touch circuit board 210.

A mobile communication module, which can transmit a wireless signal to, or receive a wireless signal from, at least one of a base station, an external terminal, and a server via a mobile communication network, may be further mounted on the main circuit board 700. Examples of the wireless signal include an audio signal, a video call signal, or various types of data resulting from the transmission or receipt of a text/multimedia message. An audio output device such as a speaker which is capable of outputting sound may be further mounted on the main circuit board 700.

The lower cover 900 may be disposed below the middle frame 600 and the main circuit board 700. The lower cover 900 may be fastened and fixed to the middle frame 600. The lower cover 900 may form the bottom exterior of the display device 10. The lower cover 900 may include plastic and/or a metal.

A second camera hole CMH2, in which the camera device 720 is inserted to be projected outwardly, may be formed in the lower cover 900. The location of the camera device 720 and the locations of the first and second camera holes CMH1 and CMH2, which correspond to the camera device 720, are not limited to those illustrated in FIGS. 2, 4, and 5.

Figure 4:
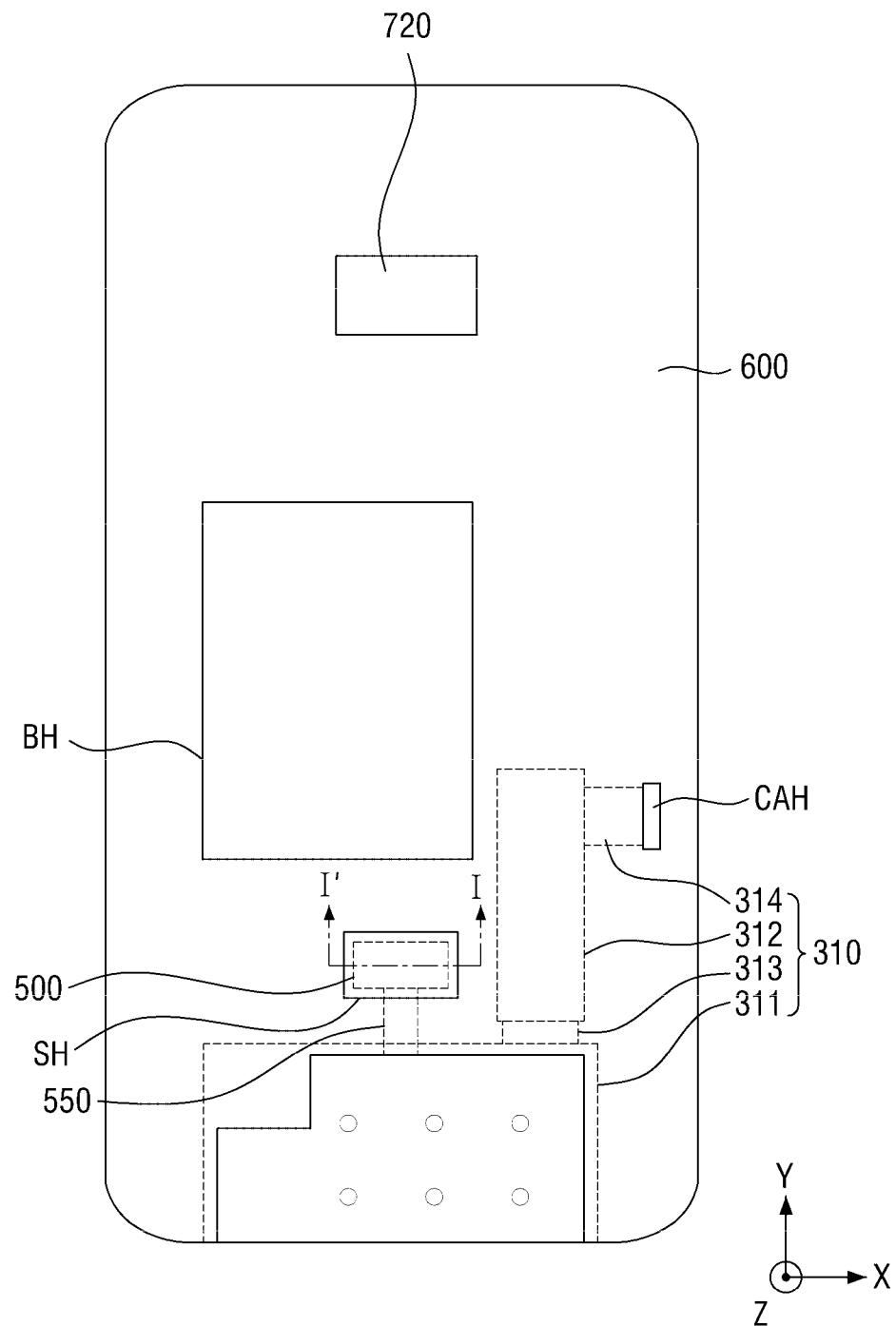
FIG. 4 is a plan view illustrating a middle frame according to an exemplary embodiment of the present disclosure.

FIG. 3 is a bottom view illustrating a display panel according to an exemplary embodiment of the present disclosure, FIG. 4 is a plan view illustrating a middle frame according to an exemplary embodiment of the present disclosure, and FIG. 5 is a bottom view illustrating a middle frame and a main circuit board according to an exemplary embodiment of the present disclosure.

It will hereinafter be described how a display circuit board 310 and a pressure sensing circuit board 550 are connected and how a second connection cable 314 and a main connector 730 of a main circuit board 700 are connected with reference to FIGS. 3, 4, and 5. It is noted that in FIGS. 3 and 4, which are bottom views, unlike in FIG. 5, which is a plan view, a display device 10 is reversed left to right. For convenience, in FIG. 4, the display circuit board 310, a pressure sensor 500, and the pressure sensing circuit board 550 are illustrated with dotted lines, and in FIG. 5, a receiving groove SH is illustrated with dotted lines.

Referring to FIGS. 3, 4, and 5, the display circuit board 310 may include a first circuit board 311, a second circuit board 312, and a first connection cable 313.

The first circuit board 311 may be attached to one side of the top or bottom surface of the substrate of a display panel 300 and may be bent toward the bottom surface of the substrate of the display panel 300. As illustrated in FIG. 4, the first circuit board 311 may be fixed into fixing holes FH, which are formed in a middle frame 600, by fixing members, but the present disclosure is not limited thereto. The first circuit board 311 may be fixed to the bottom surface of the panel bottom member 400 via an adhesive layer.

The first circuit board 311 may include a display driving unit 320, a pressure sensing unit 330, a first connector 311a, and a second connector 311b. The display driving unit 320, the pressure sensing unit 330, the first connector 311a, and the second connector 311b may be disposed on one surface of the first circuit board 311.

The first connector 311a may be connected to a first end of the first connection cable 313 that is connected to the second circuit board 312. As a result, the display driving unit 320 and the pressure sensing unit 330, which are mounted on the first circuit board 311, can be electrically connected to the second circuit board 312 via the first connection cable 313.

The second connector 311b may be connected to a first end of the pressure sensing circuit board 550, which is connected to the pressure sensor 500. As a result, the pressure sensor 500 can be electrically connected to the pressure sensing unit 330.

The second circuit board 312 may include a touch connector 312a, a first connection connector 312b, and a second connection connector 312c. The first and second connection connectors 312b and 312c may be disposed on one surface of the second circuit board 312, and the touch connector 312a may be disposed on the other surface of the second circuit board 312.

The touch connector 312a may be connected to a touch connecting part provided at a first end of a touch circuit board 210. As a result, the touch driving unit 220 can be electrically connected to the second circuit board 312.

The first connection connector 312b may be connected to a second end of the first connection cable 313 that is connected to the first circuit board 311. As a result, the display driving unit 320, which is mounted on the first circuit board 311, can be electrically connected to the second circuit board 312 via the first connection cable 313.

The second connection connector 312c may be connected to a first end of the second connection cable 314 that is connected to the main connector 730 of the main circuit board 700. As a result, the second circuit board 312 can be electrically connected to the second circuit board 312 via the second connection cable 314.

A connector connecting part 315 may be formed at a second end of the second connection cable 314. As illustrated in FIGS. 3 and 4, the connector connecting part 315 of the second connection cable 314 may extend to the bottom of the middle frame 600 through a cable hole CAH of the middle frame 600.

Also, as illustrated in FIG. 5, since there exists a gap between the middle frame 600 and the main circuit board 700, the connector connecting part 315 of the second connection cable 314 that passes through a cable hole CAH may extend to the bottom of the main circuit board 700 through the gap between the middle frame 600 and the main circuit board 700. Finally, the connector connecting part 315 of the second connection cable 314 may be connected to the main connector 730, which is disposed on the bottom surface of the main circuit board 700.

According to the exemplary embodiment of FIGS. 3, 4, and 5, the second connection cable 314, which is connected to the display circuit board 310, may extend to the bottom of the middle frame 600 through the cable hole CAH and may thus be connected to the main connector 730 of the main circuit board 700. Accordingly, the display circuit board 310 and the main circuit board 700 can be stably connected.

Figure 6:
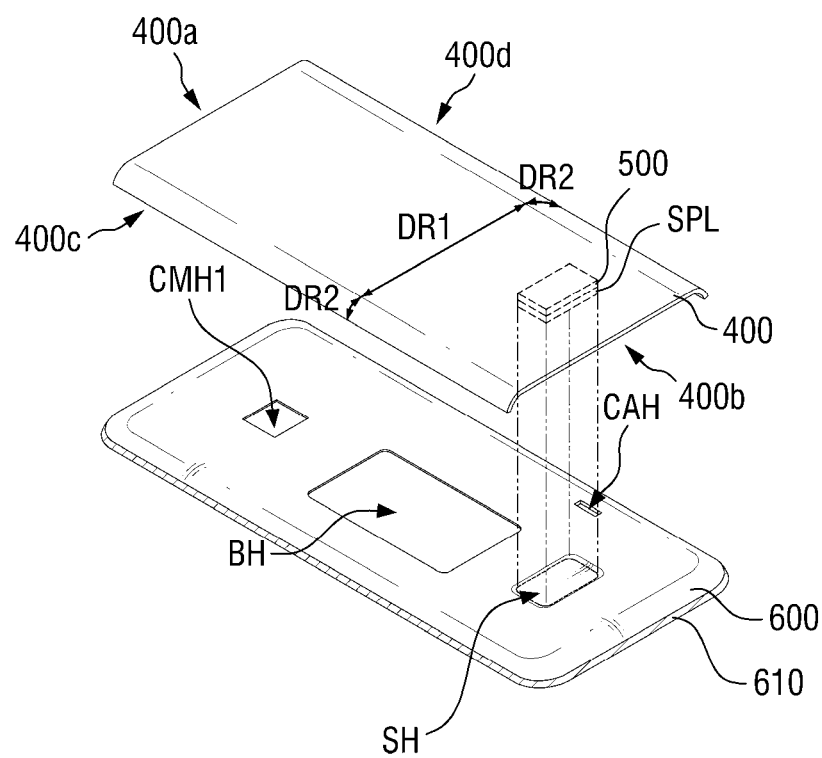
FIG. 6 is a perspective view illustrating the arrangement of a pressure sensor and a receiving groove according to an exemplary embodiment of the present disclosure.
Figure 7:
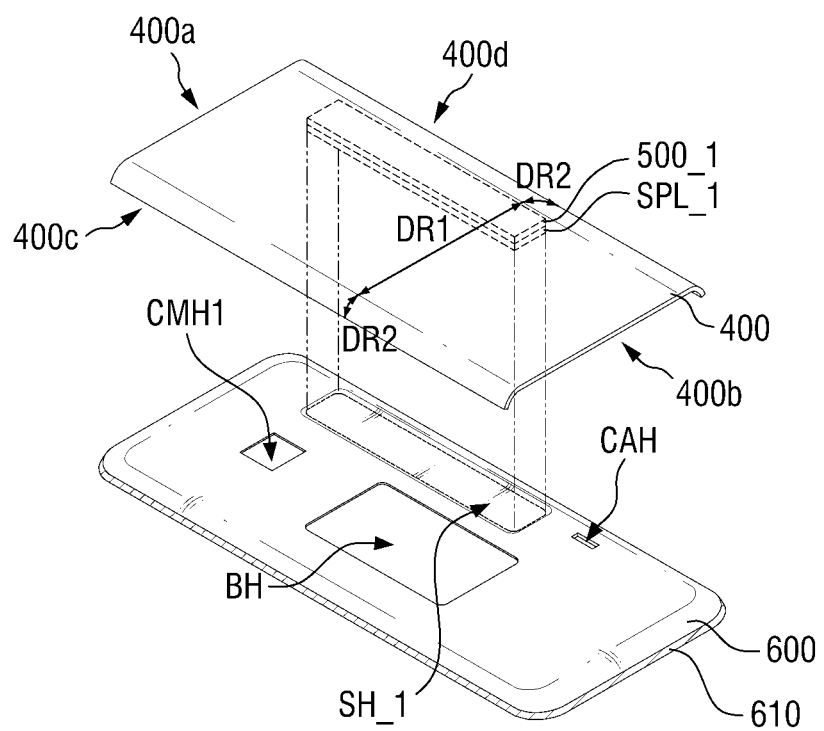
FIG. 7 is a perspective view illustrating the arrangement of a pressure sensor and a receiving groove according to another exemplary embodiment of the present disclosure.
Figure 8:
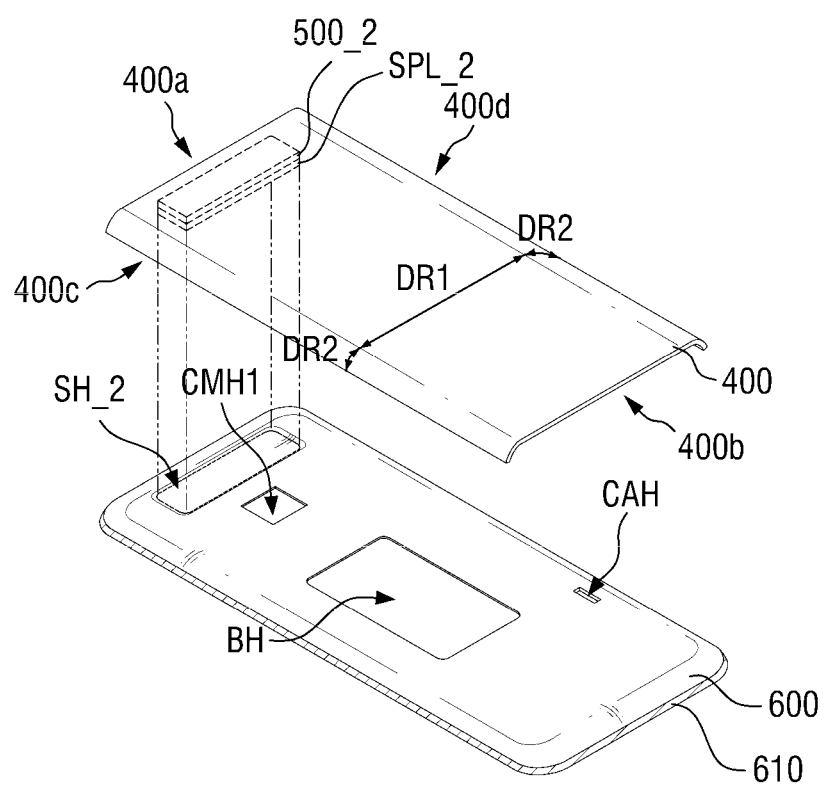
FIG. 8 is a perspective view illustrating the arrangement of a pressure sensor and a receiving groove according to another exemplary embodiment of the present disclosure.

FIG. 6 is a perspective view illustrating the arrangement of a pressure sensor and a receiving groove according to an exemplary embodiment of the present disclosure, FIG. 7 is a perspective view illustrating the arrangement of a pressure sensor and a receiving groove according to another exemplary embodiment of the present disclosure, and FIG. 8 is a perspective view illustrating the arrangement of a pressure sensor and a receiving groove according to another exemplary embodiment of the present disclosure.

Referring to FIG. 6, a panel bottom member 400 may include first and second short sides 400a and 400b, which are opposite to each other in a first direction (or an X-axis direction), and first and second long sides 400c and 400d, which are opposite to each other in a second direction (or a Y-axis direction), and may include a first region DR1, which is flat, and second regions DR2, which extend from the left and right sides of the first region DR1 and are curved.

A pressure sensor 500 and a supporting layer SPL are disposed on the bottom surface of the panel bottom member 400 that faces a middle frame 600. For example, the pressure sensor 500 may be attached and fixed to the bottom surface of the panel bottom member 400 that faces the middle frame 600, and the supporting layer SPL may be attached and fixed to the bottom surface of the pressure sensor 500. The pressure sensor 500 and the supporting layer SPL may be disposed on the bottom surface of the first region DR1 of the panel bottom member 400 to be close to the second short side 400b. FIGS. 6, 7, and 8 illustrate that the pressure sensor 500 and the supporting layer SPL have a rectangular shape, but the present disclosure is not limited thereto. That is, the pressure sensor 500 and the supporting layer SPL may have various other shapes such as a circular shape, an elliptical shape, a polygonal shape other than a rectangular shape. Also, the pressure sensor 500 and the supporting layer SPL may have different shapes.

The middle frame 600 may be disposed below the panel bottom member 400, and the middle frame 600 and the panel bottom member 400 may be attached and fixed together by a waterproof member 610, which is disposed along the edges of the middle frame 600. A receiving groove SH is disposed on the top surface of the middle frame 600 to correspond to the pressure sensor 500 and the supporting layer SPL. The receiving groove SH may be formed to have a larger area than the pressure sensor 500 and the supporting layer SPL in consideration that the pressure sensor 500 and the panel bottom member 400 are received in the receiving groove SH. In some embodiments, the pressure sensor 500 and the supporting layer SPL may have different areas, in which case, the receiving groove SH may have a larger area than the pressure sensor 500 and the supporting layer SPL. Also, the receiving groove SH may be formed to have a shape corresponding to the shape of the pressure sensor 500 and the supporting layer SPL, but the present disclosure is not limited thereto. That is, the receiving groove SH may be formed in various shapes that can properly receive the pressure sensor 500.

Referring to FIG. 7, a pressure sensor 500_1 and a supporting layer SPL_1 may be disposed on the bottom surface of a first region DR1 of a panel bottom member 400 to be close to a second long side 400d of the panel bottom member 400, but the present disclosure is not limited thereto. Alternatively, the pressure sensor 500_1 and the supporting layer SPL_I may be disposed not only on the bottom surface of the first region DR1, but also on the bottom surface of one of second regions DR2 of the panel bottom member 400, to be close to the second long side 400d, or may be disposed on the bottom surface of one of the second regions DR2 of the panel bottom member 400 to be close to the second long side 400d. Still alternatively, the pressure sensor 500_1 and the supporting layer SPL_1 may be disposed not only on the bottom surface of the first region DR1, but also on the bottom surface of one of the second regions DR2 of the panel bottom member 400, to be close to a first long side 400c of the panel bottom member 400, or may be disposed on the bottom surface of one of the second regions DR2 of the panel bottom member 400 to be close to the first long side 400c.

A receiving groove SH_1 is disposed on the top surface of a middle frame 600 to correspond to the pressure sensor 500_1 and the supporting layer SPL_1.

Referring to FIG. 8, a pressure sensor 500_2 and a supporting layer SPL_2 may be disposed on the bottom surface of a first region DR1 of a panel bottom member 400 to be close to a first short side 400a of the panel bottom member 400. A receiving groove SH_2 is disposed on the top surface of a middle frame 600 to correspond to the pressure sensor 500_2 and the supporting layer SPL_2.

The pressure sensor 500, the supporting layer SPL, and the receiving groove SH of FIG. 6, the pressure sensor 500_1, the supporting layer SPL_I, and the receiving groove SH_1 of FIG. 7, and the pressure sensor 500_2, the supporting layer SPL_2, and the receiving groove SH_2 of FIG. 8 may be provided alone or in combination with one another. For example, the pressure sensor 500, the supporting layer SPL, and the receiving groove SH of FIG. 6 and the pressure sensor 500_1, the supporting layer SPL_1, and the receiving groove SH_1 of FIG. 7 may be provided together to be used as physical buttons, or the pressure sensor 500, the supporting layer SPL, and the receiving groove SH of FIG. 6, the pressure sensor 500_1, the supporting layer SPL_1, and the receiving groove SH_1 of FIG. 7, and the pressure sensor 500_2, the supporting layer SPL_2, and the receiving groove SH_2 of FIG. 8 may be provided to together to be used as physical buttons.

FIG. 9 is a cross-sectional view taken along sectional line I-I' of FIGS. 3 and 4.

The cover window 100, the touch sensing device 200, the display panel 300, the panel bottom member 400, the first adhesive member 910, the second adhesive member 920, the third adhesive member 930, and the fourth adhesive member 940 of FIG. 9 have already been described above with reference to FIGS. 1 and 2, and thus, detailed descriptions thereof will be omitted.

Referring to FIG. 9, the pressure sensor 500 is attached and fixed to the bottom surface of the panel bottom member 400 via the fourth adhesive member 940, and the supporting layer SPL is disposed on the bottom surface of the pressure sensor 500. Although not specifically illustrated, an adhesive layer may be disposed between the supporting layer SPL and the bottom surface of the pressure sensor 500 to attach and fix the supporting layer SPL and the pressure sensor 500 together.

As already mentioned above, the pressure sensor 500 and the supporting layer SPL are received in the receiving groove SH of the middle frame 600. The receiving groove SH may include a bottom surface SHa and first and second side surfaces SHb and SHc, which extend vertically from the bottom surface SHa in a thickness direction, i.e., in the third direction (or the Z-axis direction), but the present disclosure is not limited thereto. The first and second side surfaces SHb and SHc may extend from the bottom surface SHa at a predetermined inclination.

The pressure sensor 500 may have a first thickness D1 in the thickness direction, i.e., in the third direction (or the Z-axis direction), and the supporting layer SPL may have a second thickness D2, which is smaller than the first thickness D1, in the thickness direction, i.e., in the third direction (or the Z-axis direction). However, the present disclosure is not limited to this. Alternatively, the thickness of the second supporting layer SPL in the third direction (or the Z-axis direction), i.e., the second thickness D2, may be greater than the thickness of the pressure sensor 500 in the third direction (or the Z-axis direction), i.e., the first thickness D1. The first thickness D1 may be 50 μm to 250 μm, and the second thickness D2 may be 10 μm to 500 μm.

The pressure sensor 500 may have a first width W1 in the first direction (or the X-axis direction), the supporting layer SPL may have a second width W2, which is the same as the first width W1, in the first direction (or the X-axis direction), and the bottom surface SHa may have a third width, which is greater than the first and second width W1 and W2, in the first direction (or the X-axis direction). However, the present disclosure is not limited to this. Alternatively, the pressure sensor 500 may have a first width W1 in the first direction (or the X-axis direction), the supporting layer SPL may have a second width W2, which is greater than the first width W1, in the first direction (or the X-axis direction), and the bottom surface SHa may have a third width W3, which is greater than the second width W2, in the first direction (or the X-axis direction). Still alternatively, the pressure sensor 500 may have a first width W1 in the first direction (or the X-axis direction), the supporting layer SPL may have a second width W2, which is smaller than the first width W1, in the first direction (or the X-axis direction), and the bottom surface SHa may have a third width W3, which is greater than the first width W1, in the first direction (or the X-axis direction).

The supporting layer SPL and the bottom surface SHa may be spaced apart from each other in the thickness direction, i.e., in the third direction (or the Z-axis direction), and a distance D3 between the supporting layer SPL and the bottom surface SHa may be about 0.1 mm to 0.4 mm, but it is not limited thereto.

The pressure sensor 500 and the supporting layer SPL may have different rigidities. For example, the supporting layer SPL may be more rigid than the pressure sensor 500. In this case, in response to pressure being applied in the opposite direction of the third direction (i.e., in the opposite direction of the Z-axis direction), a first pressure sensing layer PSL1, which will be described later, may be placed in contact with a first driving electrode TE1 and a first sensing electrode RE1 due to the difference in rigidity between the pressure sensor 500 and the supporting layer SPL and may thus be able to detect pressure. Even when the pressure sensor 500 is neither in contact with, nor fixed to, the middle frame 600, the pressure sensor 500 can detect pressure applied to the display device 10 because the supporting layer SPL, which is more rigid than the pressure sensor 500, is disposed on the bottom surface of the pressure sensor 500. Accordingly, damage to, and the malfunction of, the pressure sensor 500 that may be caused by mechanical tolerances, processing error, and the like when the pressure sensor 500 is in contact with, and fixed to, the panel bottom member 400 and the middle frame 600 can be prevented or reduced.

Figure 10:
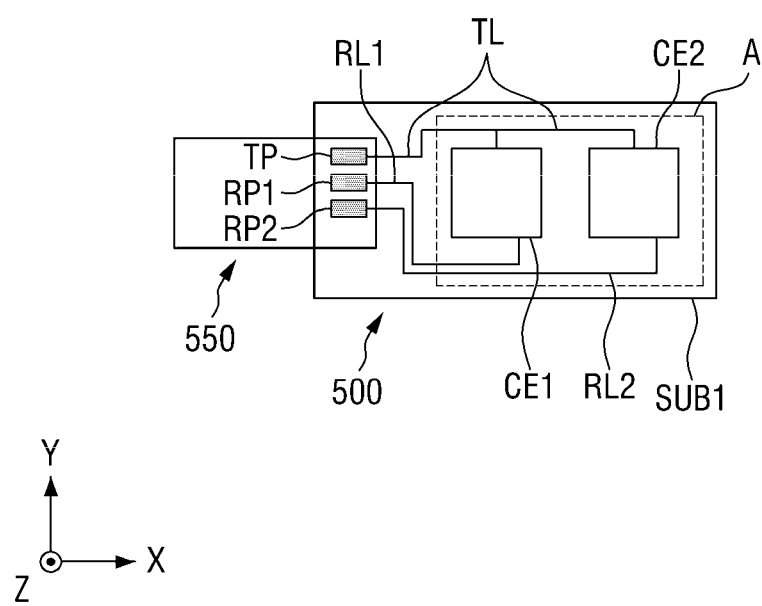
FIG. 10 is a plan view illustrating a pressure sensor according to an exemplary embodiment of the present disclosure.
Figure 11:
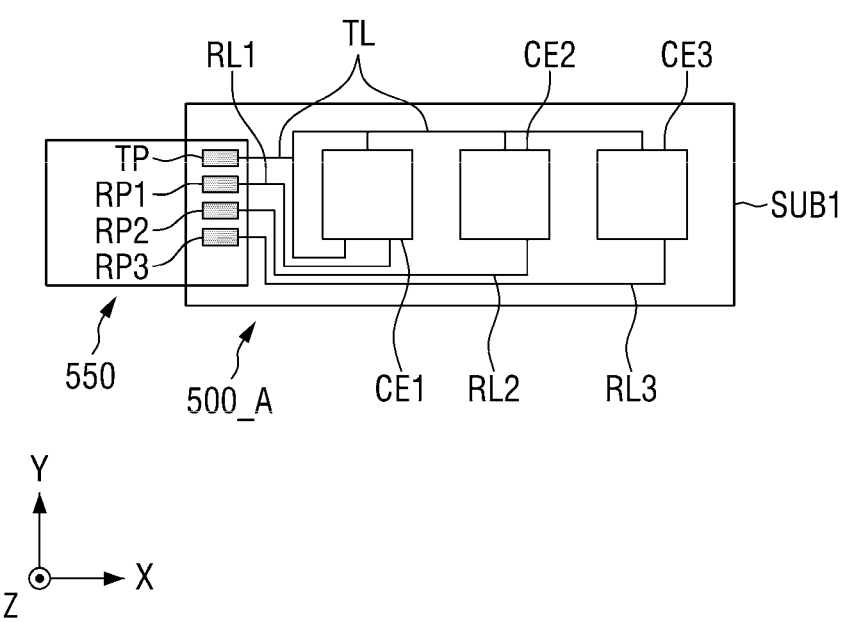
FIG. 11 is a plan view illustrating a pressure sensor according to another exemplary embodiment of the present disclosure.

FIG. 10 is a plan view illustrating a pressure sensor according to an exemplary embodiment of the present disclosure, and FIG. 11 is a plan view illustrating a pressure sensor according to another exemplary embodiment of the present disclosure.

Referring to FIG. 10, a pressure sensor 500 includes a first substrate SUB1, first and second sensing cells CE1 and CE2, a driving line TL, first and second sensing lines RL and RL2, a driving pad TP, and first and second sensing pads RP1 and RP2.

The first substrate SUB1I may include a PE-, PI-, PC-, polysulfone-, polyacrylate-, polystyrene (PS)-, polyvinyl chloride (PVC)-, polyvinyl alcohol (PVA)-, polynor- bornene-, or polyester-based material. In one embodiment, the first substrate SUB1 may be formed as a PET film or a PI film.

Sensing cells are disposed on one surface of the first substrate SUB. For example, the first and second sensing cells CE1 and CE2 may be disposed on one surface of the first substrate SUB1, but the present disclosure is not limited thereto. That is, the number of sensing cells provided may vary depending on the functions and the location of the pressure sensor 500. FIG. 10 illustrates that the first and second sensing cells CE1 and CE2 are arranged in a row, but the present disclosure is not limited thereto. Alternatively, the first and second sensing cells CE1 and CE2 may be arranged in multiple rows if necessary.

The first and second sensing cells CE1 and CE2 may be disposed on the first substrate SUB1 to be spaced apart from each other, but the present disclosure is not limited thereto. Alternatively, the first and second sensing cells CE1 and CE2 may be arranged next to each other on the first substrate SUB1 with no gap therebetween.

The first sensing cell CE1 may detect a resistance variation caused by pressure, and the second sensing cell CE2 may detect a resistance variation caused by temperature. For example, the pressure sensor 500 may detect pressure applied thereto, using the first sensing cell CE1 and may detect a resistance variation caused by temperature, using the second sensing cell CE2. Accordingly, a pressure sensing unit 330, which is disposed on a display circuit board 310, can compensate for a resistance value detected by the first sensing cell CE1 with a resistance value detected by the second sensing cell CE2 and can thus compensate for any discrepancy in the resistance value detected by the first sensing cell CE1, caused by temperature. Therefore, the reliability of the pressure sensor 500 can be improved. However, the present disclosure is not limited to this. Alternatively, the first and second sensing cells CE1 and CE2 may both be implemented as pressure sensing cells.

The size of the first and second sensing cells CE1 and CE2 may vary depending on the purpose of use of the first and second sensing cells CE1 and CE2. For example, in a case where the first and second sensing cells CE1 and CE2 are used as physical buttons such as volume buttons, the first and second sensing cells CE1 and CE2 may be formed to have a similar size to physical buttons. Also, in a case where the first and second sensing cells CE1 and CE2 are used to detect pressure applied to the front surface of the display device 10, the first and second sensing cells CE1 and CE2 may be formed to a size corresponding to a pressure sensing area.

Each of the first and second sensing cells CE1 and CE2 may be connected to at least one driving line and at least one sensing line. For example, as illustrated in FIG. 10, the first and second sensing cells CE1 and CE2 may both be connected to the same driving line, i.e., the driving line TL, and may be connected to different sensing lines, i.e., the first and second sensing lines RL1 and RL2, respectively. The first sensing cell CE1 may be connected to the driving line TL and the first sensing line RL1, and the second sensing cell CE2 may be connected to the driving line TL and the second sensing line RL2.

The driving line TL may be connected to the driving pad TP, and the first and second sensing lines RL1 and RL2 may be connected to the first and second sensing pads RP1 and RP2, respectively. For example, the first sensing line RL1 may be connected to the first sensing pad RP1, and the second sensing line RL2 may be connected to the second sensing pad RP2. The driving pad TP and the first and second sensing pads RP1 and RP2 may be disposed on one side of the first substrate SUB1 and may be connected to a pressure sensing circuit board 550 via an anisotropic conductive film.

The pressure sensing circuit board 550 may be connected to the pressure sensing to unit 330, which is disposed on the display circuit board 310. The pressure sensing unit 330 can detect pressure and temperature applied to the first and second sensing cells CE1 and CE2 by detecting current values or voltage values from the first and second sensing lines RL1 and RL2 via the first and second sensing pads RP1 and RP2.

Referring to FIG. 11, a pressure sensor 500_A includes a first substrate SUB1, first, second, and third sensing cells CE1, CE2, and CE3, a driving line TL, first, second, and third sensing lines RL1, RL2, and RL3, a driving pad TP, and first, second, and third sensing pads RP1, RP2, and RP3.

The first and third sensing cells CE1 and CE3 may detect a resistance variation caused by pressure, and the second sensing cell CE2 may detect a resistance variation caused by temperature. For example, the pressure sensor 500_A may detect pressure applied thereto, using the first and third sensing cells CE1 and CE3 and may detect a resistance variation caused by temperature, using the second sensing cell CE2. Accordingly, the pressure sensing unit 330, which is disposed on the display circuit board 310, can compensate for resistance values detected by the first and third sensing cells CE1 and CE3 with a resistance value detected by the second sensing cell CE2 and can thus compensate for any discrepancies in the resistance values detected by the first and third sensing cells CE1 and CE3, caused by temperature.

Each of the first, second, and third sensing cells CE1, CE2, and CE3 may be connected to at least one driving line and at least one sensing line. For example, the first, second, and third sensing cells CE1, CE2, and CE3 may all be connected to the same driving line, i.e., the driving line TL, and may be connected to different sensing lines, i.e., the first, second, and third sensing lines RL1, RL2, and RL3, respectively. For example, the first sensing cell CE1 may be connected to the driving line TL and the first sensing line RL1, the second sensing cell CE2 may be connected to the driving line TL and the second sensing line RL2, and the third sensing cell CE3 may be connected to the driving line TL and the third sensing line RL3.

The driving line TL may be connected to the driving pad TP, and the first, second, and third sensing lines RL1, RL2, and RL3 may be connected to the first, second, and third sensing pads RP1, RP2, and RP3, respectively. For example, the first sensing line RL1 may be connected to the first sensing pad RP1, the second sensing line RL2 may be connected to the second sensing pad RP2, and the third sensing line RL3 may be connected to the third sensing pad RP3. The driving pad TP and the first, second, and third sensing pads RP1, RP2, and RP3 may be disposed on one side of the first substrate SUB1 and may be connected to the pressure sensing circuit board 550 via an anisotropic conductive film.

Figure 12:
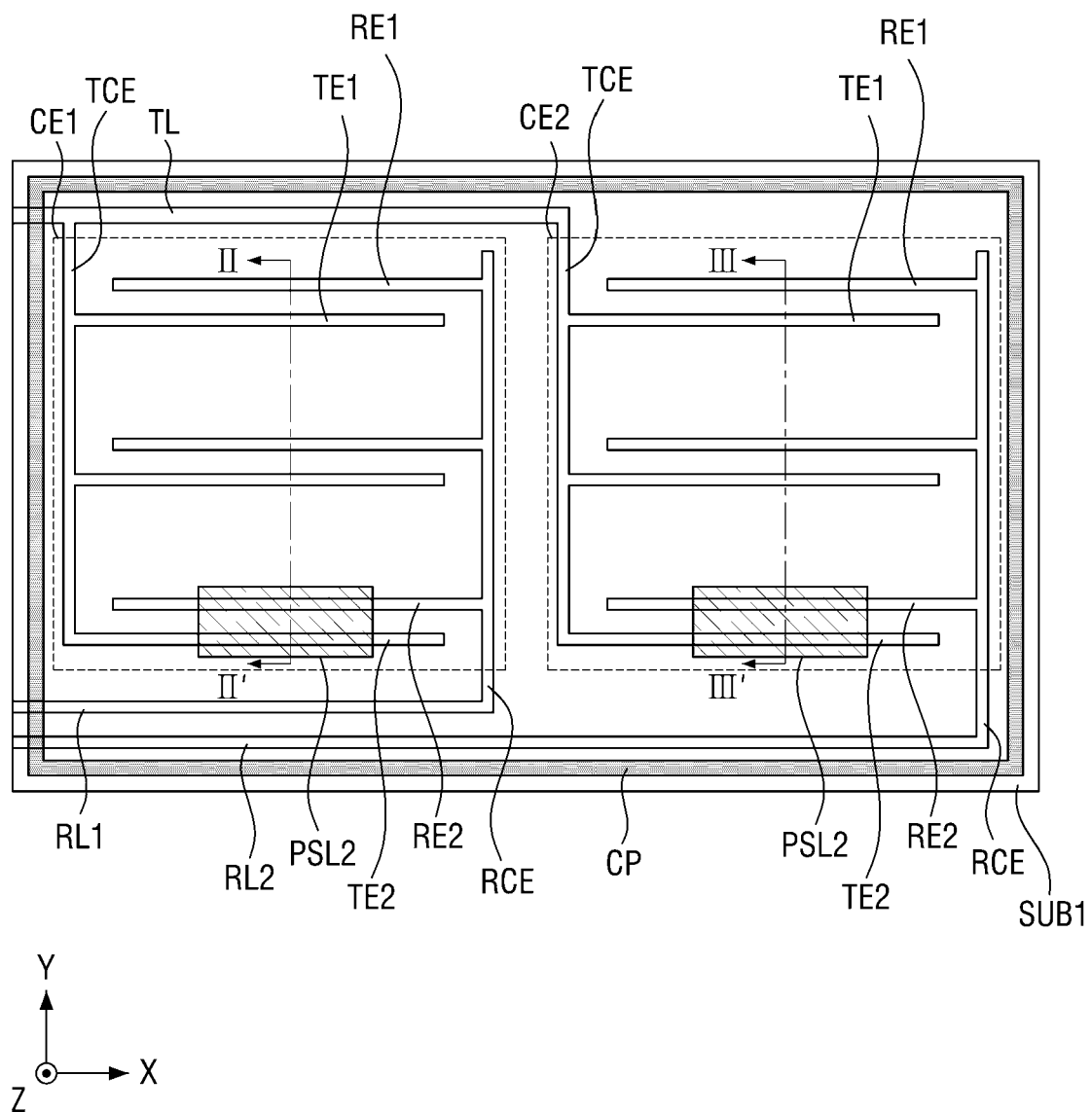
FIG. 12 is a detailed plan view illustrating an area A of FIG. 10.
Figure 13:
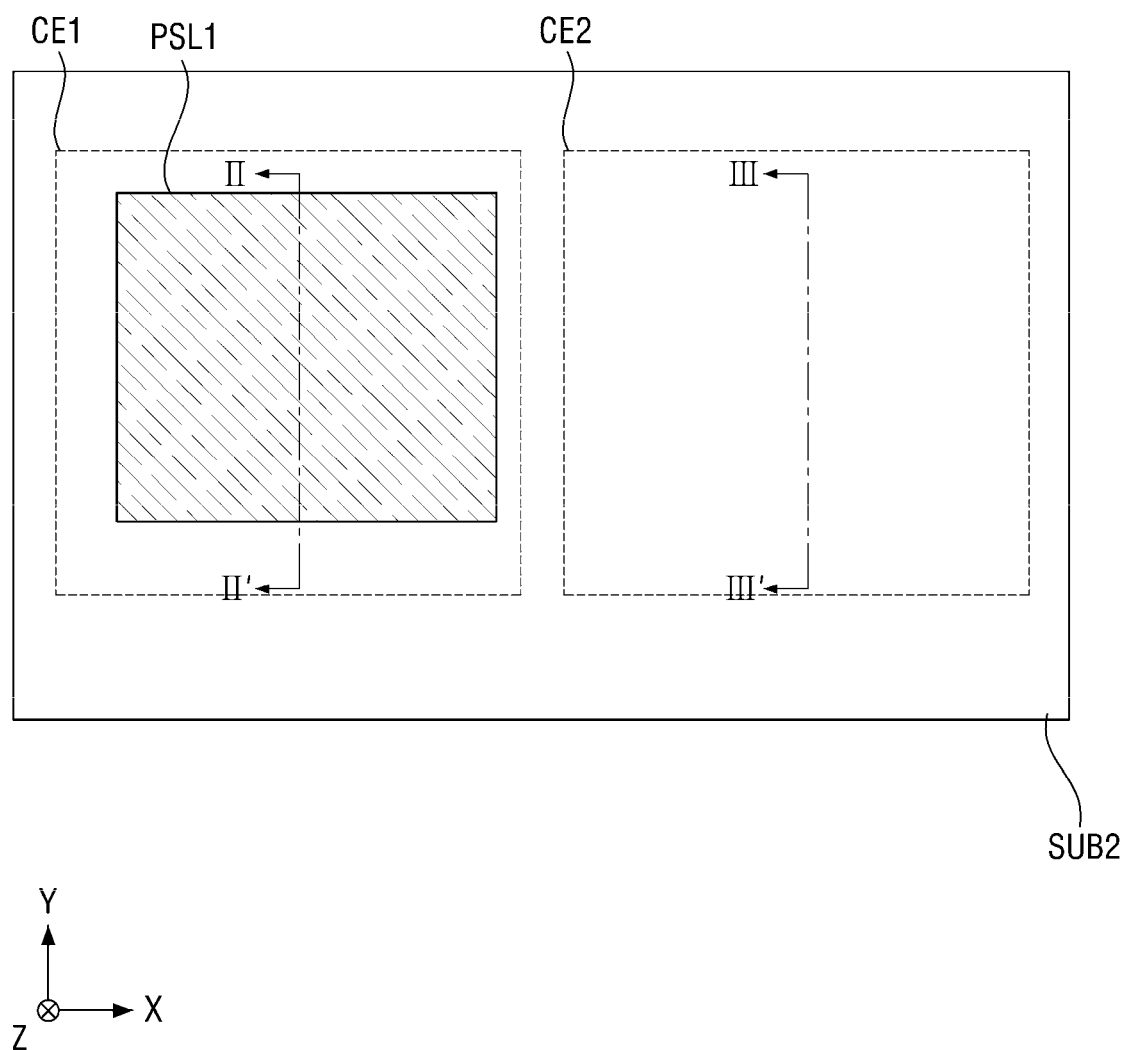
FIG. 13 is a plan view illustrating a second substrate of a pressure sensor according to an exemplary embodiment of the present disclosure.

FIG. 12 is a detailed plan view illustrating an area A of FIG. 10, and FIG. 13 is a plan view illustrating a second substrate of a pressure sensor according to an exemplary embodiment of the present disclosure.

Referring to FIGS. 12 and 13, the pressure sensor 500 may further include a coupling layer CP, which is disposed between the first substrate SUB1 and a second substrate SUB2 to couple the first substrate SUB1 and the second substrate SUB2 together. The coupling layer CP may be formed as a pressure sensitive adhesive (PSA) layer or an adhesive layer. The coupling layer CP may be disposed along the edges of each of the first and second substrates SUB1 and SUB2. In one embodiment, the coupling layer CP may completely surround the edges of each of the first and second substrates SUB1 and SUB2 and may thus seal the inside of the pressure sensor 500. Also, the coupling layer CP may serve as a spacer for uniformly maintaining the gap between the first and second substrates SUB1 and SUB2. In some embodiments, the coupling layer CP may not overlap with the driving line TL, the first and second sensing lines RL1 and RL2, the first and second sensing cells CE1 and CE2, the driving pad TP, and the first and second sensing pads RP1 and RP2.

FIGS. 12 and 13 illustrate that the coupling layer CP is attached to the first substrate SUB1, but the present disclosure is not limited thereto. Alternatively, the coupling layer CP may be attached first to one surface of the first or second substrate SUB1 or SUB2 and may then be attached to one surface of the other substrate in the process of bonding the first and second substrates SUB1 and SUB2 together. Still alternatively, coupling layers CP may be provided on both the first and second substrates SUB1 and SUB2 and may be attached to each other in the process of bonding the first and second substrates SUB1 and SUB2 together.

The first sensing cell CE1 may include a driving connecting electrode TCE, a sensing connecting electrode RCE, first and second driving electrodes TE1 and TE2, which are branched off of the driving connecting electrode TCE, first and second sensing electrodes RE1 and RE2, which are branched off of the sensing connecting electrode RCE, and first and second pressure sensing layers PSL1 and PSL2.

The second sensing cell CE2 may include a driving connecting electrode TCE, a sensing connecting electrode RCE, first and second driving electrodes TE1 and TE2, which are branched off of the driving connecting electrode TCE, first and second sensing electrodes RE1 and RE2, which are branched off of the sensing connecting electrode RCE, and a second pressure sensing layer PSL2.

The driving connecting electrode TCE, the sensing connecting electrode RCE, the first driving electrode TE1, the second driving electrode TE2, the first sensing electrode RE1, the second sensing electrode RE2, and the second pressure sensing layer PSL2 of each of the first and second sensing cells CE1 and CE2 may be disposed on a surface of the first substrate SUB1 that faces the second substrate SUB2, and the first pressure sensing layer PSL1 of the first sensing cell CE1 may be disposed on a surface of the second substrate SUB2 that faces the first substrate SUB1. However, the present disclosure is not limited to this.

The driving connecting electrode TCE of each of the first and second sensing cells CE1 and CE2 is connected to the driving line TL and the first and second driving electrodes TE1 and TE2 of the corresponding sensing cell. Specifically, an end, in a length direction, i.e., in the second direction (or the Y-axis direction), of the driving connecting electrode TCE of each of the first and second sensing cells CE1 and CE2 is connected to the driving line TL. The first and second driving electrodes TE1 and TE2 of each of the first and second sensing cells CE1 and CE2 may be branched off from the driving connecting electrode TCE of the corresponding sensing cell in a width direction, i.e., in the first direction (or the X-axis direction).

The sensing connecting electrode RCE of the first sensing cell CE1 is connected to the first sensing line RL1 and the first and second sensing electrodes RE1 and RE2 of the first sensing cell CE1, and the sensing connecting electrode RCE of the second sensing cell CE2 is connected to the second sensing line RL2 and the first and second sensing electrodes RE1 and RE2 of the second sensing cell CE2. Specifically, an end, in the length direction, i.e., in the second direction (or the Y-axis direction), of the sensing connecting electrode RCE of the first sensing cell CE1 is connected to the first sensing line RL1, an end, in the length direction, i.e., in the second direction (or the Y-axis direction), of the sensing connecting electrode RCE of the second sensing cell CE2 may be connected to the second sensing line RL2, and the first and second sensing electrodes RE1 and RE2 of each of the first and second sensing cells CE1 and CE2 may be branched off of the sensing connecting electrode RCE of the corresponding sensing to cell in the opposite direction of the first direction (i.e., in the opposite direction of the X-axis direction).

The first and second driving electrodes TE1 and TE2 and the first and second sensing electrodes RE1 and RE2 of each of the first and second sensing cells CE1 and CE2 may be disposed in the same layer. The first and second driving electrodes TE1 and TE2 and the first and second sensing electrodes RE1 and RE2 of each of the first and second sensing cells CE1 and CE2 may be formed of the same material. For example, the first and second driving electrodes TE1 and TE2 and the first and second sensing electrodes RE1 and RE2 of each of the first and second sensing cells CE1 and CE2 may include a conductive material such as Ag or Cu. The first and second driving electrodes TE1 and TE2 and the first and second sensing electrodes RE1 and RE2 of each of the first and second sensing cells CE1 and CE2 may be formed by screen printing.

The first driving electrode TE1 and the first sensing electrode RE1 of each of the first and second sensing cells CE1 and CE2 may be disposed adjacent to, but not connected to, each other and may be arranged in parallel.

The second driving electrode TE2 and the second sensing electrode RE2 of each of the first and second sensing cells CE1 and CE2 may be disposed adjacent to, but not connected to, each other and may be arranged in parallel.

The second sensing electrode RE2 of each of the first and second sensing cells CE1 and CE2 may be disposed between the first and second driving electrodes TE1 and TE2 of the corresponding sensing cell. In this case, the distance between the second driving electrode TE2 and the second sensing electrode RE2 of each of the first and second sensing cells CE1 and CE2 may be smaller than the distance between the first driving electrode TE1 and the first sensing electrode RE1 of each of the first and second sensing cells CE1 and CE2.

The first pressure sensing layer PSL1 is disposed on the surface of the second substrate SUB2 that faces the first substrate SUB1. The first pressure sensing layer PSL1 may be disposed to overlap the first sensing cell CE1 in the thickness direction, i.e., in the third direction (or the Z-axis direction). Specifically, the first pressure sensing layer PSL1 may be disposed to overlap with the first driving electrode TE1 and the first sensing electrode RE1 of the first sensing cell CE1 in the thickness direction, i.e., in the third direction (or the Z-axis direction).

The first pressure sensing layer PSL1 may include a pressure sensitive material and a polymer resin in which the pressure sensitive material is disposed. The pressure sensitive material may be fine particles (or nano-particles) of a metal such as Ni, aluminum (Al), titanium (Ti), tin (Sb), or Cu. For example, the first pressure sensitive layer PSL1 may include a quantum tunneling composite (QTC).

The second driving electrode TE2 and the second sensing electrode RE2 of each of the first and second sensing cells CE1 and CE2 may not overlap with the first pressure sensing layer PSL1 of the corresponding sensing cell. The second pressure sensing layer PSL2 of each of the first and second sensing cells CE1 and CE2 may be disposed on the second driving electrode TE2 and the second sensing electrode RE2 of the corresponding sensing cell. In some embodiments, the second pressure sensing layer PSL2 of each of the first and second sensing cells CE1 and CE2 may be disposed on the first substrate SUB1 to cover the second driving electrode TE2 and the second sensing electrode RE2 of the corresponding sensing cell. For example, the second pressure sensing layer PSL2 of each of the first and second sensing cells CE1 and CE2 may be disposed to cover the top surface and the sides of each of the second driving electrode TE2 and the second sensing electrode RE2 of the corresponding sensing cell. Accordingly, the second driving electrode TE2 and the second sensing electrode RE2 of each of the first and second sensing cells CE1 and CE2 can be connected via the second pressure sensing layer PSL2 of the corresponding sensing cell. However, the present disclosure is not limited to this. In another example, the second pressure sensing layer PSL2 of each of the first and second sensing cells CE1 and CE2 may be disposed to cover only the sides of each of the second driving electrode TE2 and the second sensing electrode RE2 of the corresponding sensing cell, in which case, the top surfaces of the second driving electrode TE2 and the second sensing electrode RE2 of each of the first and second sensing cells CE1 and CE2 may be exposed.

The second pressure sensing layer PSL2 of each of the first and second sensing cells CE1 and CE2 may be formed of the same material as the first pressure sensing layer PSL1 of the first sensing cell CE1. In this case, the second pressure sensing layer PSL2 of each of the first and second sensing cells CE1 and CE2 may include a pressure sensitive material and a polymer resin in which the pressure sensitive material is disposed. The pressure sensitive material may be fine particles of a metal such as Ni, Al, Ti, Sb, or Cu. For example, the second pressure sensitive material PSL2 of each of the first and second sensing cells CE1 and CE2 may include a QTC.

The first sensing cell CE1 may include a first resistor having resistance variable in accordance with pressure applied to the first pressure sensing layer PSL1 and a second resistor which is defined by the second pressure sensing layer PSL2 that is in contact with the second driving electrode TE2 and the second sensing electrode RE2 of the first sensing cell CE1. That is, since the first sensing cell CE1 includes the second resistor, which is not related to the pressure applied to the first pressure sensing layer PSL1, the resistance of the first sensing cell CE1 may be lowered. Accordingly, the range of variation of the resistance of the first sensing cell CE1, which is to be detected by a pressure sensing unit FD, can be considerably reduced. Also, since a resistance value detected by the first sensing cell CE1 can be compensated for using a resistance value detected by the second sensing cell CE2, any discrepancy in the resistance value detected by the first sensing cell CE1, caused by temperature, can be compensated for, and as a result, the reliability of the pressure sensor 500 can be improved.

Figure 14:
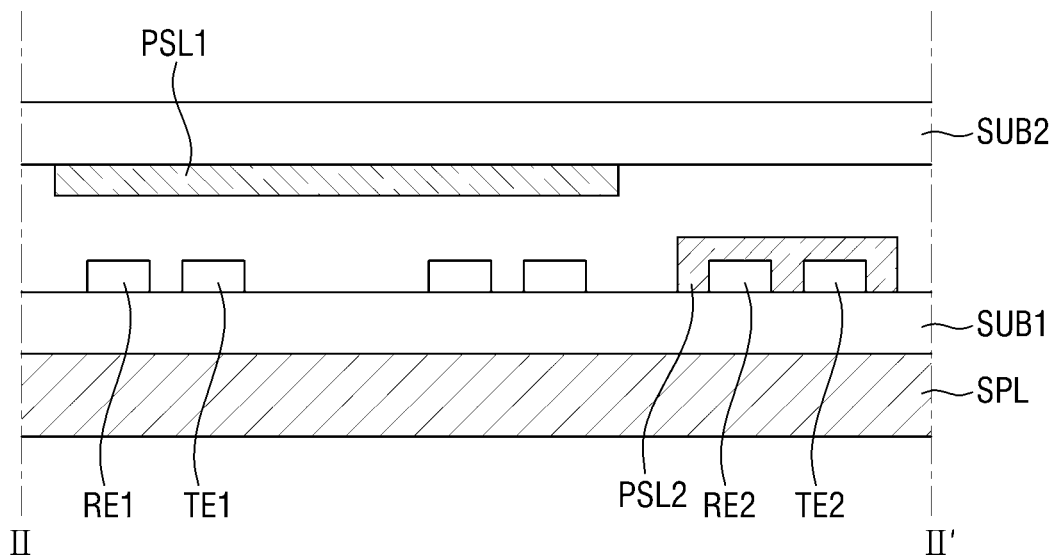
FIG. 14 is a cross-sectional view taken along sectional line II-II' of FIGS. 12 and 13.
Figure 15:
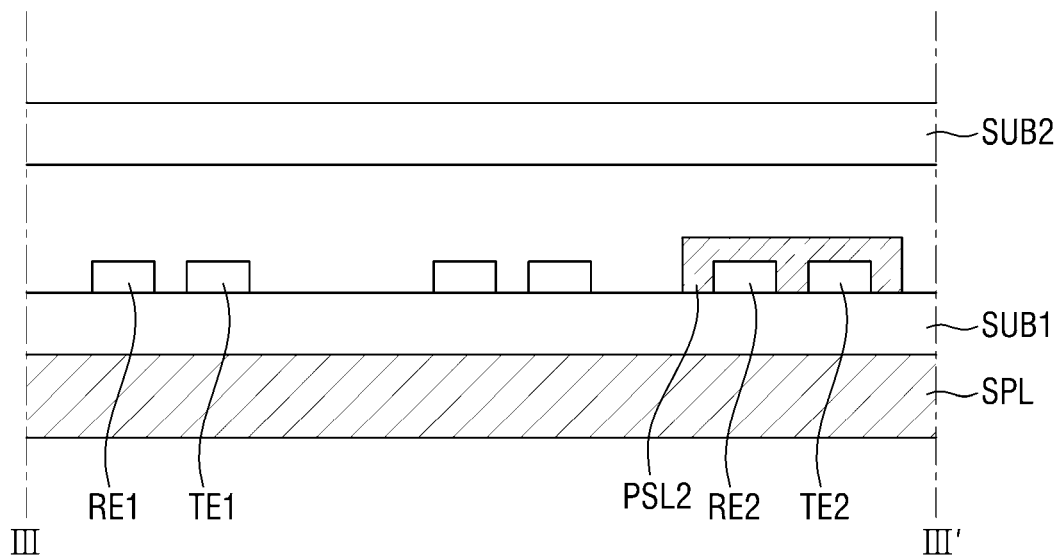
FIG. 15 is a cross-sectional view taken along sectional line III-III' of FIGS. 12 and 13.

FIG. 14 is a cross-sectional view taken along sectional line II-II' of FIGS. 12 and 13, and FIG. 15 is a cross-sectional view taken along sectional line III-III' of FIGS. 12 and 13.

Referring to FIG. 14, the first and second pressure sensing layers PSL1 and PSL2 of the first sensing cell CE1 are disposed on different substrates. For example, the first pressure sensing layer PSL1 of the first sensing cell CE1 may be disposed on the bottom surface of the second substrate SUB2 that faces the first substrate SUB1, and the second pressure sensing layer PSL2 of the first sensing cell CE1 may be disposed on the top surface of the first substrate SUB1 that faces the second substrate SUB2.

The first pressure sensing layer PSL1 of the first sensing cell CE1 may be disposed to overlap with the first driving electrode TE1 and the first sensing electrode RE1 of the first sensing cell CE1 in the thickness direction, i.e., in the third direction (or the Z-axis direction), and the second pressure sensing layer PSL2 of the first sensing cell CE1 may be disposed to overlap with the second driving electrode TE2 and the second sensing electrode RE2 of the first sensing cell CE1 in the thickness direction, i.e., in the third direction (or the Z-axis direction). Also, the second pressure sensing layer PSL2 of the first sensing cell CE1 may be disposed on the first substrate SUB1 to cover the second driving electrode TE2 and the second sensing electrode RE2 of the first sensing cell CE1.

The first and second pressure sensing layers PSL1 and PSL2 of the first sensing cell CE1 may be disposed to be spaced apart from each other in the second direction (or the Y-axis direction).

Referring to FIG. 15, the second sensing cell CE2 differs from the first sensing cell CE1 in that it includes no first pressure sensing layer PSL1. The differences between the first and second sensing cells CE1 and CE2 have already been described above with reference to FIGS. 12 and 13, and thus, a detailed description thereof will be omitted.

Figure 16:
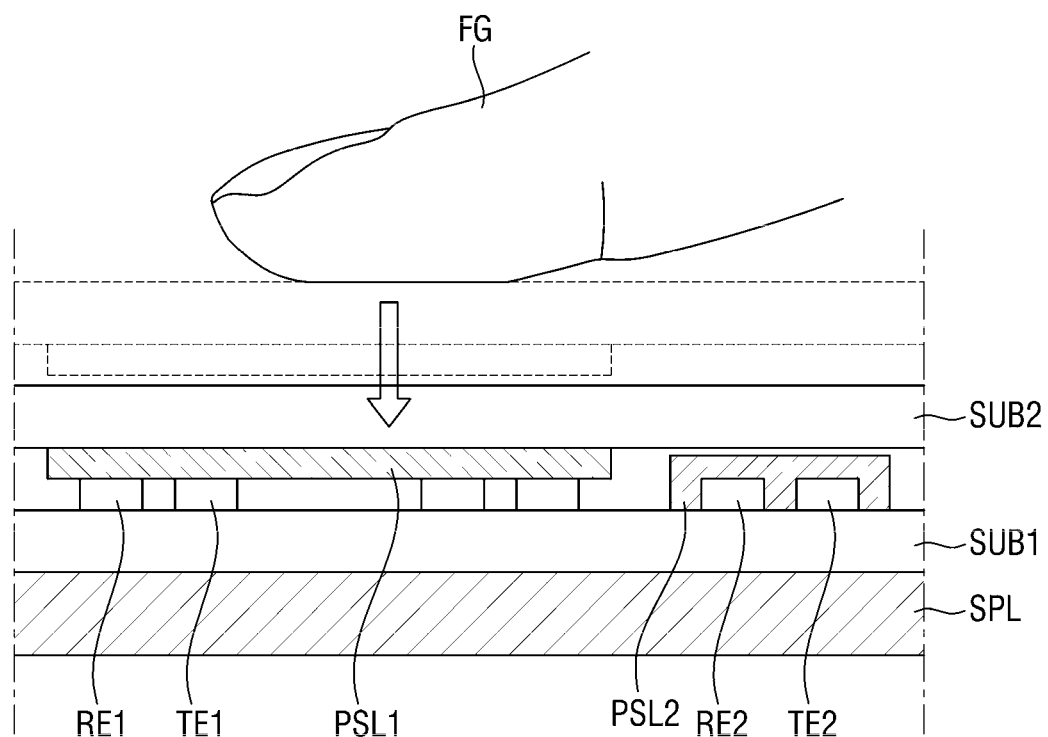
FIG. 16 is a cross-sectional view illustrating a case where a user applies a pressure with a finger to a pressure sensor having a supporting layer according to an exemplary embodiment of the present disclosure.

FIG. 16 is a cross-sectional view illustrating a case where a user presses, with a finger, a pressure sensor having a supporting layer according to an exemplary embodiment of the present disclosure.

Referring to FIG. 16, a supporting layer SPL is disposed on the bottom surface of a pressure sensor 500. For example, the supporting layer SPL is disposed on the bottom surface of a first substrate SUB1 of the pressure sensor 500. As already mentioned above, the supporting layer SPL is more rigid than the pressure sensor 500. Also, the detection of pressure by the pressure sensor 500 may be affected not only by the rigidity of the supporting layer SPL, but also by the thickness and area of the supporting layer SPL, due to the presence of the supporting layer SPL.

In response to a user pressing the pressure sensor 500, in which the supporting layer SPL is disposed, in the opposite direction of a third direction (i.e., in the opposite direction of a Z-axis direction) with a finger FG, a second substrate SUB2 of the pressure sensor 500 may be lowered toward the first substrate SUB1, and as a result, a first pressure sensing layer PSL1 of a first sensing cell CE1 may be placed in contact with a first driving electrode TE1 and a first sensing electrode RE1 of the first sensing cell CE1.

As the first pressure sensing layer PSL1 is placed in contact with the first driving electrode TE1 and the first sensing electrode RE1, the first driving electrode TE1 and the first sensing electrode RE1 may be physically connected via the first pressure sensing layer PSL1, and the first pressure sensing layer PSL1 may serve as a resistor. Also, since the contact areas of the first pressure sensing layer PSL1 and the first driving electrode TE1 and of the first pressure sensing layer PSL1 and the first sensing electrode RE1 vary depending on pressure applied to the pressure sensor 500, the resistance of the first sensing cell CE1 varies. Accordingly, a pressure sensing unit 330 can detect the pressure applied to the pressure sensor 500 by the finger FG of the user by applying a driving voltage to a driving line TL of the pressure sensor 500 and detecting a current value or a voltage value, resulting from a resistance variation, via a sensing line RL of the pressure sensor 500.

Even when the pressure sensor 500 is neither in contact with, nor fixed to, a middle frame 600, the pressure sensor 500 can detect pressure applied to the display device 10 because the supporting layer SPL, which is more rigid than the pressure sensor 500, is disposed on the bottom surface of the pressure sensor 500. Accordingly, damage to, and the malfunction of, the pressure sensor 500 that may be caused by mechanical tolerances, processing error, and the like when the pressure sensor 500 is in contact with, and fixed to, a panel bottom member 400 and the middle frame 600 can be prevented or reduced.

Figure 17:
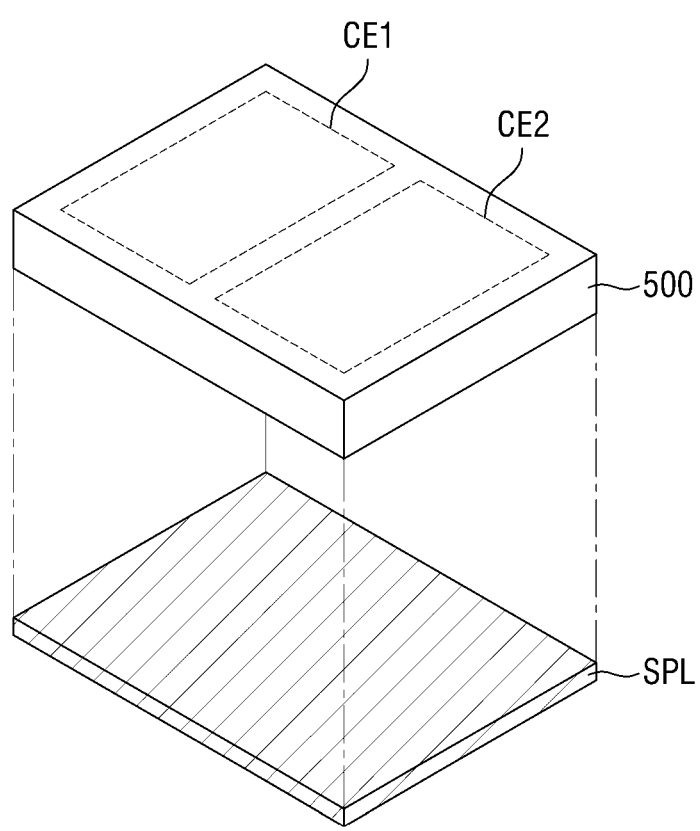
FIG. 17 is a perspective view illustrating the arrangement of a pressure sensor and a supporting layer according to an exemplary embodiment of the present disclosure.
Figure 18:
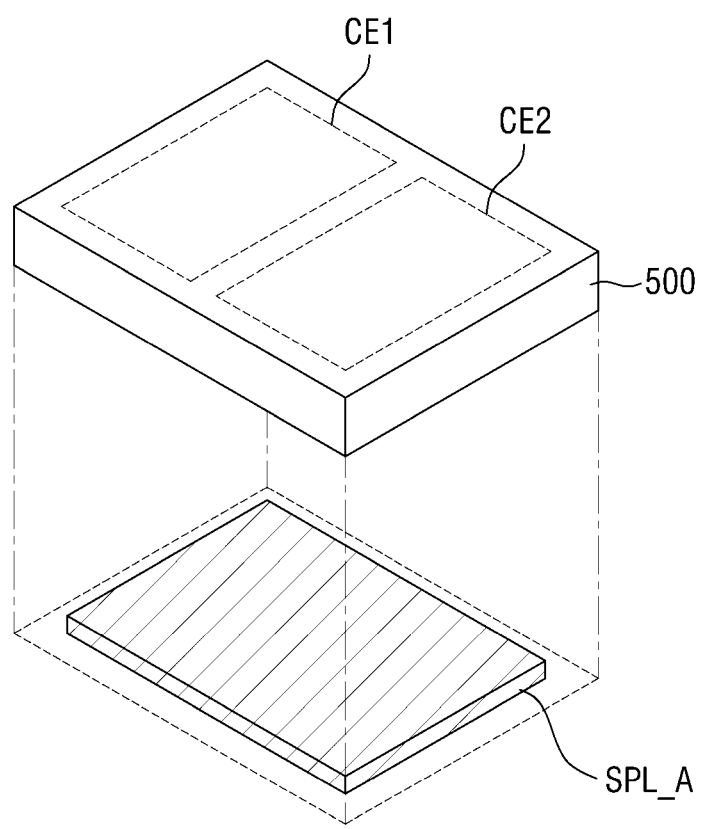
FIG. 18 is a perspective view illustrating the arrangement of a pressure sensor and a supporting layer according to another exemplary embodiment of the present disclosure.
Figure 19:
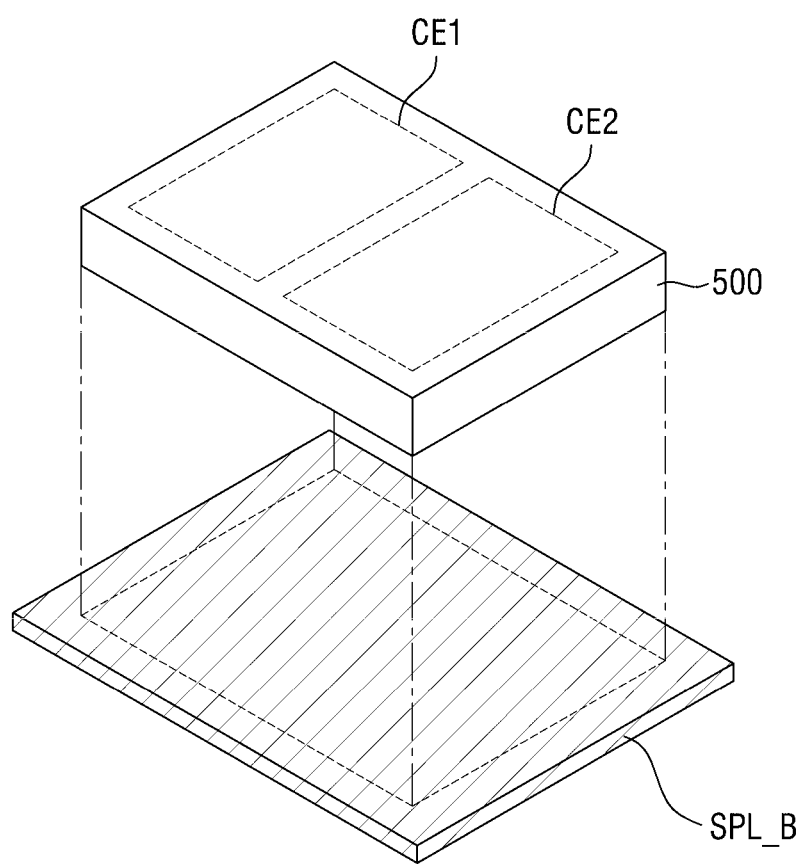
FIG. 19 is a perspective view illustrating the arrangement of a pressure sensor and a supporting layer according to another exemplary embodiment of the present disclosure.
Figure 20:
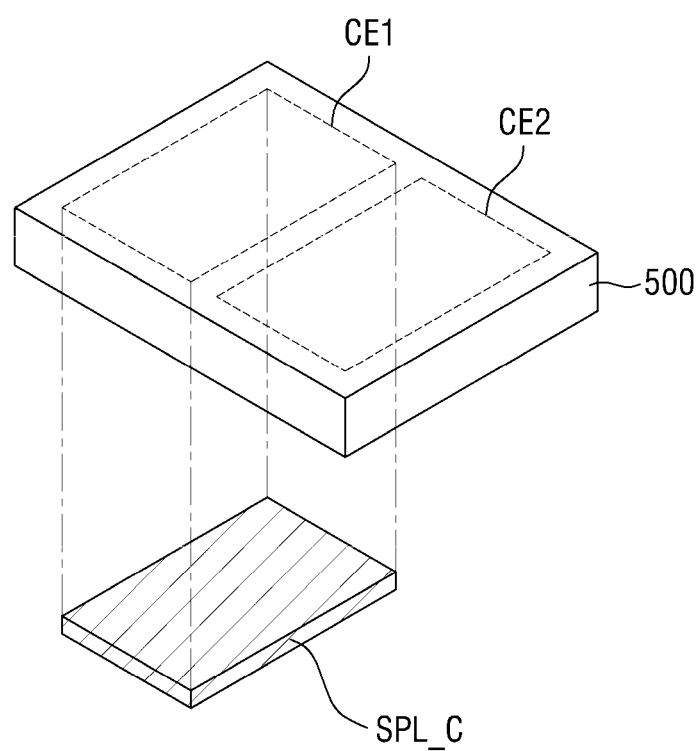
FIG. 20 is a perspective view illustrating the arrangement of a pressure sensor and a supporting layer according to another exemplary embodiment of the present disclosure.
Figure 21:
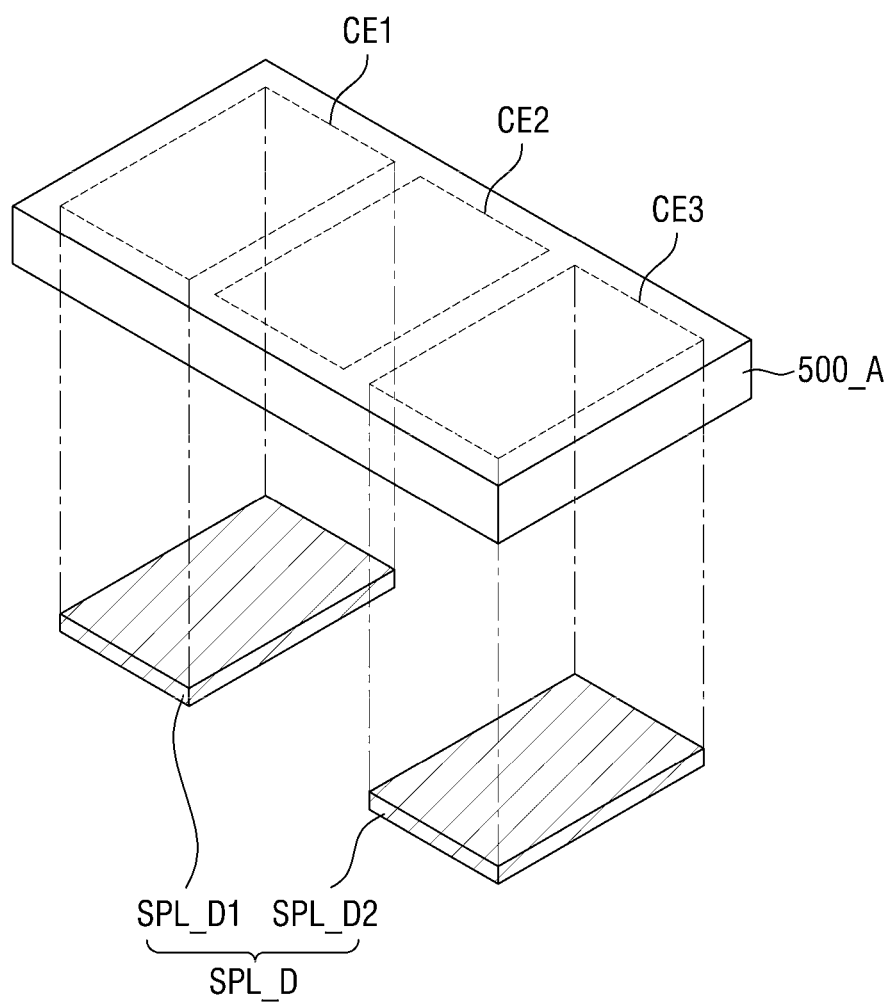
FIG. 21 is a perspective view illustrating the arrangement of a pressure sensor and a supporting layer according to another exemplary embodiment of the present disclosure.

FIG. 17 is a perspective view illustrating the arrangement of a pressure sensor and a supporting layer according to an exemplary embodiment of the present disclosure, FIG. 18 is a perspective view illustrating the arrangement of a pressure sensor and a supporting layer according to another exemplary embodiment of the present disclosure, FIG. 19 is a perspective view illustrating the arrangement of a pressure sensor and a supporting layer according to another exemplary embodiment of the present disclosure, FIG. 20 is a perspective view illustrating the arrangement of a pressure sensor and a supporting layer according to another exemplary embodiment of the present disclosure, and FIG. 21 is a perspective view illustrating the arrangement of a pressure sensor and a supporting layer according to another exemplary embodiment of the present disclosure.

Referring to FIG. 17, a pressure sensor 500 may include first and second sensing cells CE1 and CE2. The first sensing cell CE1 may detect a resistance variation caused by pressure, and the second sensing cell CE2 may detect a resistance variation caused by temperature. However, the present disclosure is not limited thereto. Alternatively, the first and second sensing cells CE1 and CE2 may both detect a resistance variation caused by pressure. A supporting layer SPL, which is disposed on the bottom surface of the pressure sensor 500, may have the same area as the pressure sensor 500, which includes the first and second sensing cells CE1 and CE2.

Referring to FIG. 18, a pressure sensor 500 may include first and second sensing cells CE1 and CE2, and a supporting layer SPL_A, which is disposed on the bottom surface of the pressure sensor 500, may have a smaller area than the pressure sensor 500, which includes the first and second sensing cells CE1 and CE2. In this case, the supporting layer SPL_A may have a smaller area than the pressure sensor 500, but may have a sufficient area to cover each of the first and second sensing cells CE1.

Referring to FIG. 19, a pressure sensor 500 may include first and second sensing cells CE1 and CE2, and a supporting layer SPL_B, which is disposed on the bottom surface of the pressure sensor 500, may have a larger area than the pressure sensor 500, which includes the first and second sensing cells CE1 and CE2. When the supporting layer SPL_B has a larger area than the pressure sensor 500, the sensitivity of the pressure sensor 500 can be improved.

Referring to FIG. 20, the pressure sensor 500 may include the first and second sensing cells CE1 and CE2. The first sensing cell CE1 may detect a resistance variation caused by pressure, and the second sensing cell CE2 may detect a resistance variation caused by temperature. A supporting layer SPL_C, which is disposed on the bottom surface of the pressure sensor 500, may have the same area as the first sensing cell CE1, but the present disclosure is not limited thereto. Alternatively, the supporting layer SPL_C may be disposed to correspond to the first sensing cell CE1 and have a larger area than the first sensing cell CE1. Still alternatively, the supporting layer SPL_C may be disposed to correspond to the first sensing cell CE1 and have a smaller area than the first sensing cell CE1.

Referring to FIG. 21, a pressure sensor 500_A may include first, second, and third sensing cells CE1, CE2, and CE3. The first and third sensing cells CE1 and CE3 may detect a resistance variation caused by pressure, and the second sensing cell CE2 may detect a resistance variation caused by temperature. A supporting layer SPL_D, which is disposed on the bottom surface of the pressure sensor 500_A, may be disposed to correspond to the first and third sensing cells CE1 and CE3, which detect pressure. For example, the supporting layer SPL_D may include first and second supporting layers SPL_D1 and SPL_D2, the first supporting layer SPL_D1 may be disposed to correspond to the first sensing cell CE1, and the second supporting layer SPL_D2 may be disposed to correspond to the third sensing cell CE3.

The first supporting layer SPL_D1 may have the same area as the first sensing cell CE1, and the second supporting layer SPL_D3 may have the same area as the third sensing cell CE3. However, the present disclosure is not limited thereto. Alternatively, the first supporting layer SPL_D1 may be disposed to correspond to the first sensing cell CE1 and have a larger area than the first sensing cell CE1, and the second supporting layer SPL_D2 may be disposed to correspond to the third sensing cell CE3 and have a smaller area than the third sensing cell CE3. Also, the first and second supporting layers SPL_D1 and SPL_D2 may have different areas.

FIGS. 17, 18, 19, 20, and 21 illustrate that the supporting layers SPL, SPL_A, SPL_B, SPL_C, and SPL-D have the same shape as the pressure sensor 500 or 500_A or the first, second, and third sensing cells CE1, CE2, and CE3, but the present disclosure is not limited thereto. Alternatively, the supporting layers SPL, SPL_A, SPL_B, SPL_C, and SPL-D may have a different shape from the pressure sensor 500 or 500_A or the first, second, and third sensing cells CE1, CE2, and CE3. Also, FIGS. 17, 18, 19, 20, and 21 illustrate that the supporting layers SPL, SPL_A, SPL_B, SPL_C, and SPL-D are single-layer films. Alternatively, the supporting layers SPL, SPL_A, SPL_B, SPL_C, and SPL-D may be formed as multilayer films.

Figure 22:
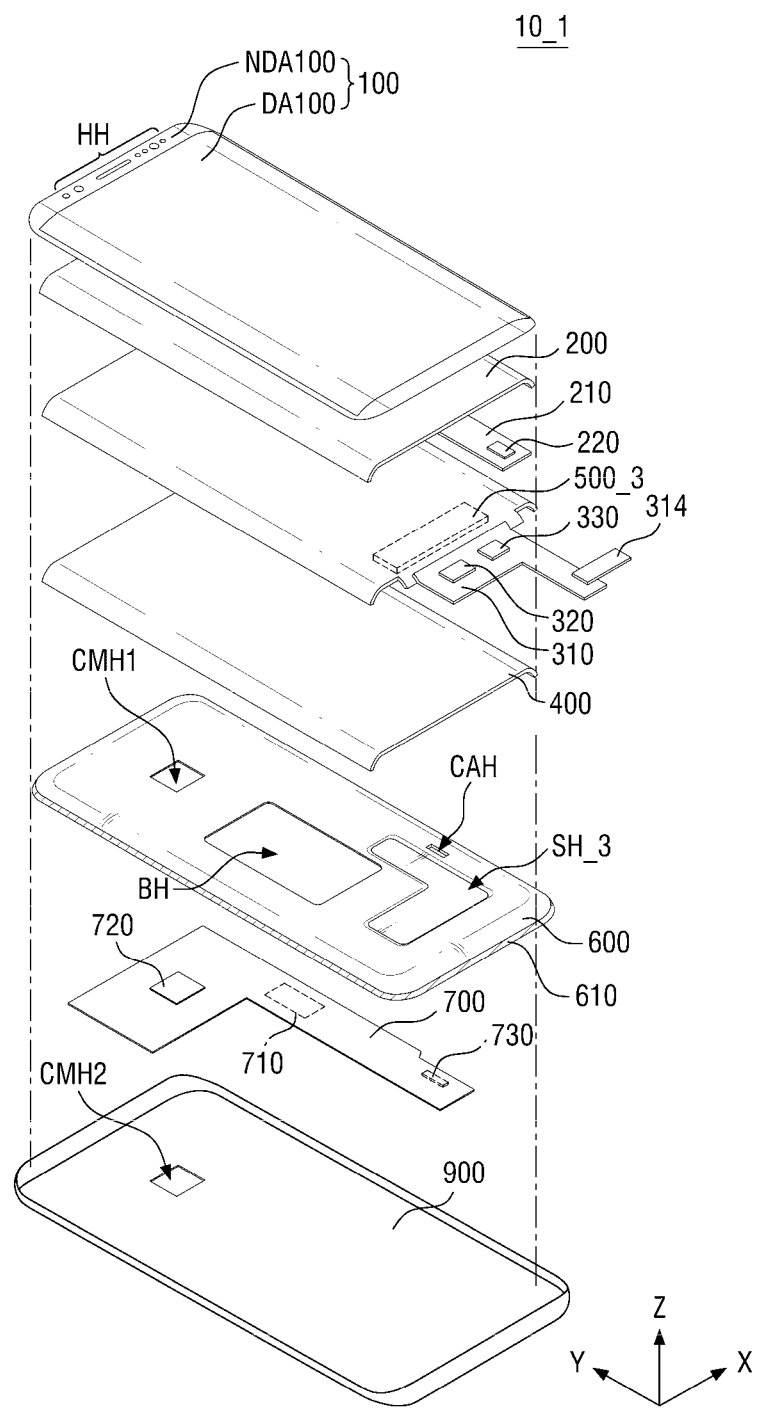
FIG. 22 is an exploded perspective view of a display device according to another exemplary embodiment of the present disclosure.
Figure 23:
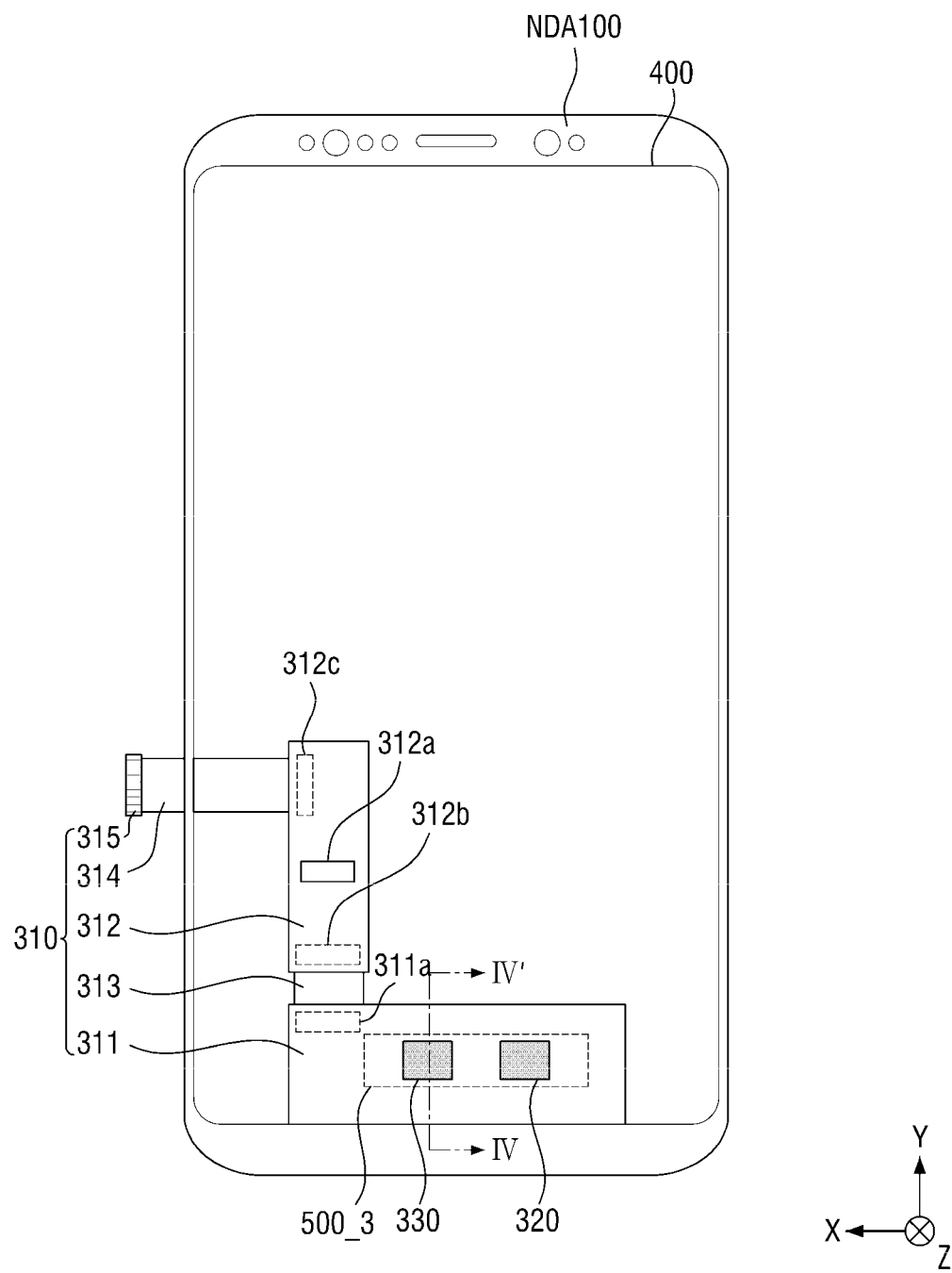
FIG. 23 is a bottom view illustrating a display panel according to another exemplary embodiment of the present disclosure.
Figure 24:
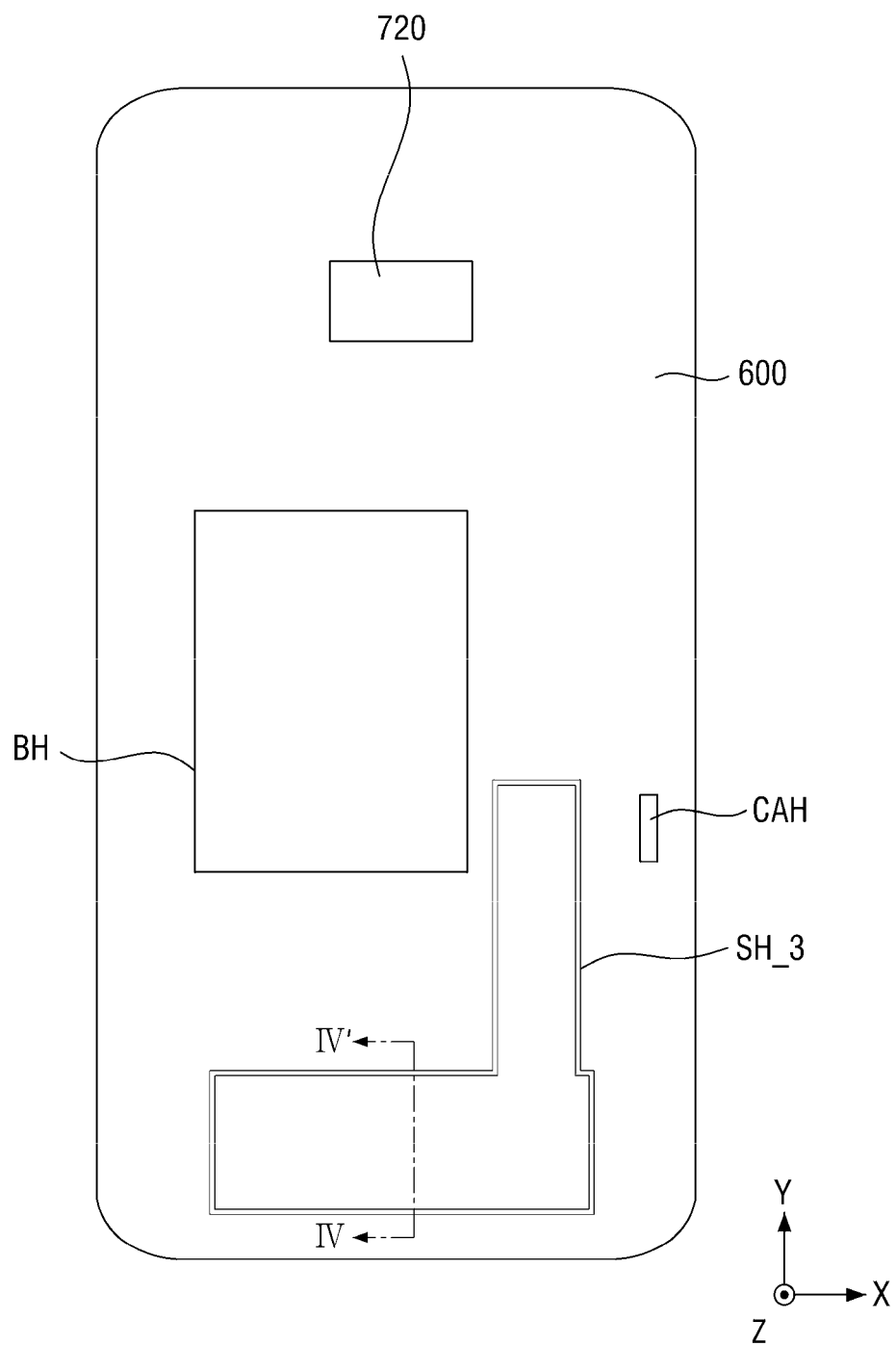
FIG. 24 is a plan view illustrating a middle frame according to another exemplary embodiment of the present disclosure.

FIG. 22 is an exploded perspective view of a display device according to another exemplary embodiment of the present disclosure, FIG. 23 is a bottom view illustrating a display panel according to another exemplary embodiment of the present disclosure, and FIG. 24 is a plan view illustrating a middle frame according to another exemplary embodiment of the present disclosure. The exemplary embodiment of FIGS. 22, 23, and 24 differs from the exemplary embodiment of FIGS. 2, 3, and 4 in the location of a pressure sensor and the shape of a receiving groove. The exemplary embodiment of FIGS. 22, 23, and 24 will hereinafter be described, focusing mainly on the differences with the exemplary embodiment of FIGS. 2, 3, and 4.

Referring to FIGS. 22, 23, and 24, a display circuit board 310 may be attached to one side of a display panel 300 and may be bent toward the bottom surfaces of the display panel 300 and a panel bottom member 400 to be settled in a middle frame 600. When the display circuit board 310 is bent toward the bottom surfaces of the display panel 300 and the panel bottom member 400 to be settled in the middle frame 600, a surface of the display circuit board 310 that faces the panel bottom member 400 is defined as the top surface of the display circuit board 310, and a surface of the display circuit board 310 that faces the middle frame 600 is defined as the bottom surface of the display circuit board 310.

Figure 28:
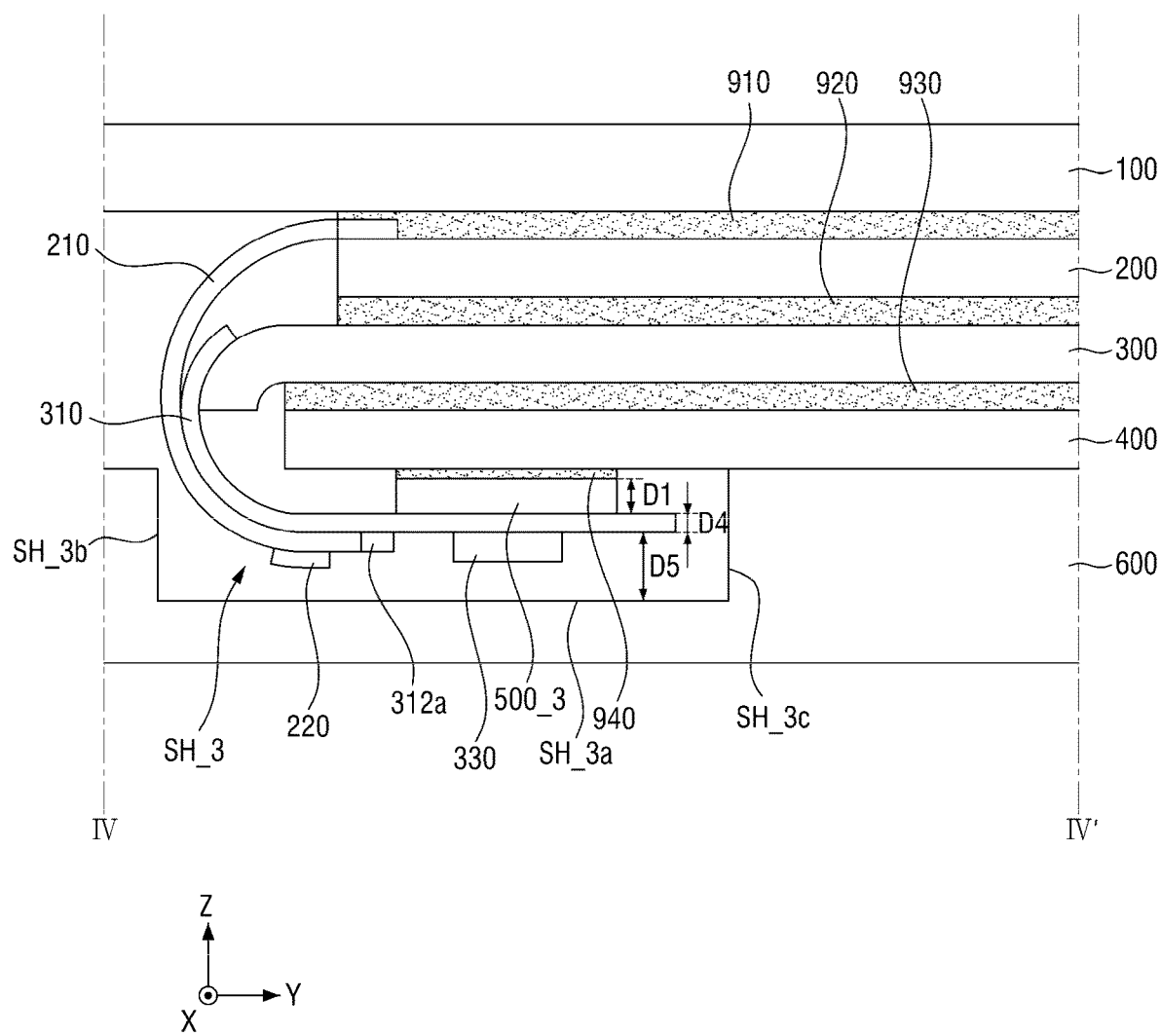
FIG. 28 is a cross-sectional view taken along sectional line IV-IV' of FIGS. 23 and 24.

A pressure sensor 500_3 may be disposed between the panel bottom member 400 and the display circuit board 310. For example, as illustrated in FIG. 28, one surface of the pressure sensor 500_3 may be attached and fixed to the bottom surface of the panel bottom member 400 via a fourth adhesive member 940, and the other surface of the pressure sensor 500_3 may be in contact with the top surface of the display circuit board 310. In this manner, the display circuit board 310 can be used as a supporting layer (SPL of FIG. 21) without the need to provide an additional supporting layer.

A display driving unit 320 and a pressure sensing unit 330 may be disposed on the bottom surface of the display circuit board 310 and may overlap with the pressure sensor 500_3 in a thickness direction, i.e., a third direction (or a Z-axis direction), but the present disclosure is not limited thereto. Alternatively, the pressure sensor 500_3 may be disposed not to overlap with the display driving unit 320 and the pressure sensing unit 330 in the thickness direction, i.e., in the third direction (or the Z-axis direction).

Specifically, the display circuit board 310 may include a first circuit board 311, a second circuit board 312, and a first connection cable 313. The display driving unit 320 and the pressure sensing unit 330 may be disposed on the bottom surface of the first circuit board 311, and the pressure sensor 500_3 may be disposed on the top surface of the first circuit board 311.

The pressure sensor 500_3 may have a larger area than the display driving unit 320 and the pressure sensing unit 330, but the present disclosure is not limited thereto. Alternatively, the pressure sensor 500_3 may have a smaller area than the display driving unit 320 and the pressure sensing unit 330, and the pressure sensor 500_3 may be divided into multiple segments.

A receiving groove SH_3 may be disposed in the middle frame 600 to correspond to the display circuit board 310, and the display circuit board 310 may be disposed in the receiving groove SH_3 of the middle frame 600.

The receiving groove SH_3 may have a larger area than the display circuit board 310. Also, the receiving groove SH_3 may be formed to have a shape correspond to the shape of the display circuit board 310, but the present disclosure is not limited thereto. That is, the receiving groove SH_3 may be formed in various shapes that can properly receive the pressure sensor 500_3. The bottom surface of the receiving groove SH_3 that faces the bottom surface of the display circuit board 310 may be a predetermined distance apart from the display driving unit 320 and the pressure sensing unit 330, which are disposed on the bottom surface of the display circuit board 310, in the third direction (or the Z-axis direction). Accordingly, the display driving unit 320 and the pressure sensing unit 330 can be prevented or protected from being damaged by being in contact with the middle frame 600.

In a case where the top surface of the display circuit board 310 is attached and fixed to the bottom surface of the pressure sensor 500_3, the display circuit board 310 can serve as a supporting layer for the pressure sensor 500_3 when pressure is applied in the opposite direction of the third direction (i.e., in the opposite direction of the Z-axis direction), and as a result, a first pressure sensing layer PSL1 can detect pressure by being placed in contact with a first driving electrode TE1 and a first sensing electrode RE1. Even when the pressure sensor 500_3 is neither in contact with, nor fixed to, the middle frame 600, the pressure sensor 500_3 can detect pressure applied to a display device 10 because the pressure sensor 500_3 is attached and fixed to the top surface of the display circuit board 310. Accordingly, damage to, and the malfunction of, the pressure sensor 500_3 that may be caused by mechanical tolerances, processing error, and the like when the pressure sensor 500_3 is in contact with, and fixed to, the panel bottom member 400 and the middle frame 600 can be prevented or reduced.

Figure 25:
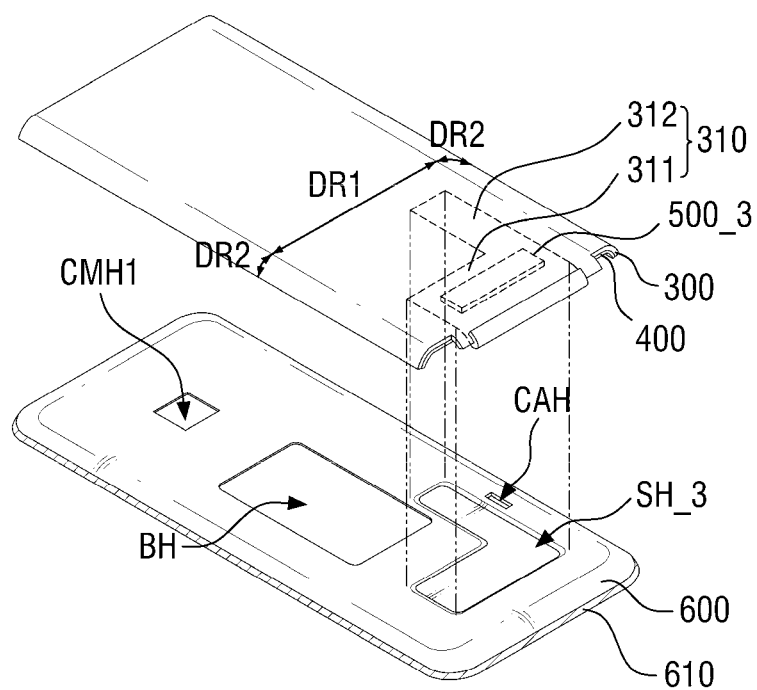
FIG. 25 is a perspective view illustrating the arrangement of a display circuit board and a pressure sensor according to an exemplary embodiment of the present disclosure.
Figure 26:
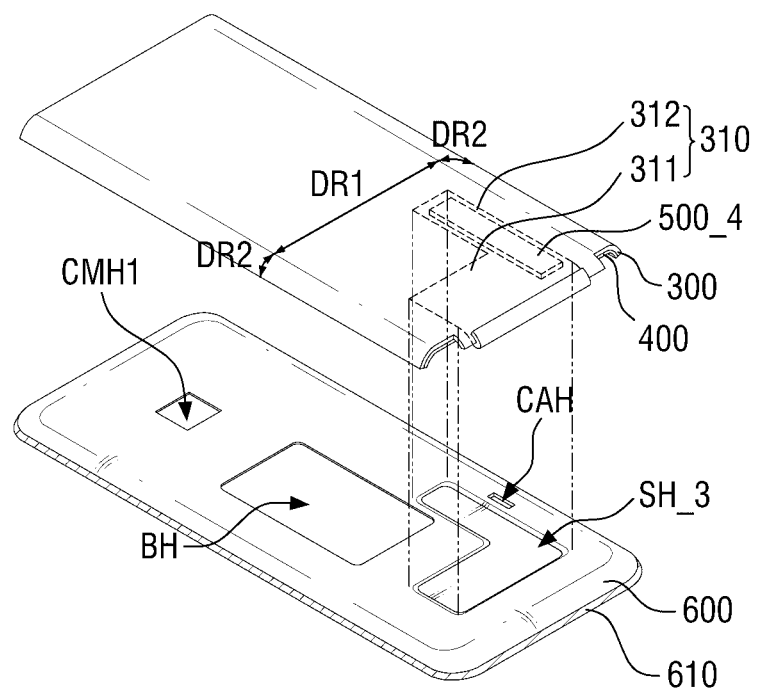
FIG. 26 is a perspective view illustrating the arrangement of a display circuit board and a pressure sensor according to another exemplary embodiment of the present disclosure.
Figure 27:
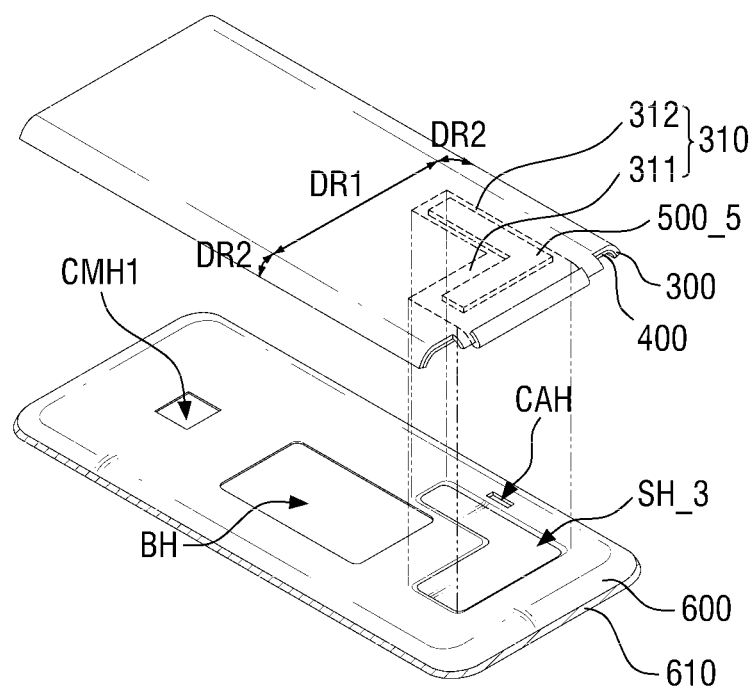
FIG. 27 is a perspective view illustrating the arrangement of a display circuit board and a pressure sensor according to another exemplary embodiment of the present disclosure.

FIG. 25 is a perspective view illustrating the arrangement of a display circuit board and a pressure sensor according to an exemplary embodiment of the present disclosure, FIG. 26 is a perspective view illustrating the arrangement of a display circuit board and a pressure sensor according to another exemplary embodiment of the present disclosure, and FIG. 27 is a perspective view illustrating the arrangement of a display circuit board and a pressure sensor according to another exemplary embodiment of the present disclosure.

Referring to FIG. 25, a display circuit board 310 may be bent toward the bottom surfaces of a display panel 300 and a panel bottom member 400 to be settled in a middle frame 600. The display circuit board 310 may include a first circuit board 311, which extends in a first direction (or an X-axis direction), and a second circuit board 312, which extends from the first circuit board 311 in a second direction (or a Y-axis direction).

A pressure sensor 500_3 may be disposed between the first circuit board 311 and a panel bottom member 400 and may extend in the first direction (or the X-axis direction) along with the first circuit board 311. The pressure sensor 500_3 may have a smaller area than the first circuit board 311, but the present disclosure is not limited thereto. Alternatively, the pressure sensor 500_3 may have a larger area than the first circuit board 311.

Referring to FIG. 26, a pressure sensor 5004 may be disposed between a display circuit board 310 and a panel bottom member 400 and may extend in a second direction (or a Y-axis direction) along with a second circuit board 312 of the display circuit board 310. In some embodiments, the pressure sensor 500_4 may be disposed along the display circuit board 310, which includes a first circuit board 311 and the second circuit board 312.

The pressure sensors 500_3, 500_4, and 500_5 of FIGS. 25, 26, and 27 are exemplary, and the present disclosure is not limited thereto. Pressure sensors of various shapes that can use a display circuit board 310 as a supporting layer can be employed.

FIG. 28 is a cross-sectional view taken along sectional line IV-IV' of FIGS. 23 and 24.

A cover window 100, a touch sensing device 200, the display panel 300, the panel bottom member 400, a first adhesive member 910, a second adhesive member 920, and a third adhesive member 930 of FIG. 28 are as described above with reference to FIGS. 1 and 2, and thus, detailed descriptions thereof will be omitted.

Referring to FIG. 28, the pressure sensor 500_3 may be attached and fixed to the bottom surface of the panel bottom member 400 via a fourth adhesive member 940, and the top surface of the display circuit board 310 may be in contact with the top surface of the display circuit board 310. Although not specifically illustrated, an adhesive layer may be disposed between the top surface of the display circuit board 310 and the bottom surface of the pressure sensor 500_3 to attach and fix the display circuit board 310 and the pressure sensor 500_3 together.

A touch circuit board 210 may be attached to one side of the touch sensing device 200, and a touch driving unit 220 may be disposed on one surface of the touch circuit board 210. The touch circuit board 210 may be connected to a touch connector 312a of the display circuit board 310.

As already mentioned above, the pressure sensor 500_3 and the display circuit board 310 are disposed in the receiving groove SH_3 of the middle frame 600. The receiving groove SH_3 may include a bottom surface SH_3a and first and second side surfaces SH_3b and SH_3c, which extend vertically from the bottom surface SH_3a in the thickness direction, i.e., in the third direction (or the Z-axis direction), but the present disclosure is not limited thereto. The first and second side surfaces SH_3b and SH_3c may extend from the bottom surface SH_3a at a predetermined inclination.

The pressure sensor 500_3 may have a first thickness D1 in the thickness direction, i.e., in the third direction (or the Z-axis direction), and the display circuit board 310 may have a fourth thickness D4, which is smaller than the first thickness D1, in the thickness direction, i.e., in the third direction (or the Z-axis direction). For example, the first thickness D1 may be 50 μm to 250 μm, and the fourth thickness D4 may be 10 μm to 30 μm. However, the present disclosure is not limited to this.

The display circuit board 310 and the bottom surface SH_3a may be spaced apart from each other in the thickness direction, i.e., in the third direction (or the Z-axis direction), and a distance D3 between the display circuit board 310 and the bottom surface SH_3a may be about 0.1 mm to 0.4 mm, but it is not limited thereto. Also, the pressure sensing unit 330 and the bottom surface SH_3a may be spaced apart from each other in the thickness direction, i.e., in the third direction (or the Z-axis direction).

The pressure sensor 500_3 may be attached and fixed to the panel bottom member 400 via the fourth adhesive member 940, the display circuit board 310 may be bent toward the bottom of the panel bottom member 400 and may be attached and fixed to the bottom surface of the pressure sensor 500_3, and the touch circuit board 210 may be bottom surface SH_3a may be bent toward the bottom of the display circuit board 310 and may be connected and fixed to the touch connector 312a, which is disposed on the bottom surface of the display circuit board 310. The touch circuit board 210, the touch driving unit 220, the display circuit board 310, the pressure sensing unit 330, and the pressure sensor 500_3 may be disposed in the receiving groove SH_3, which is formed in the middle frame 600.

The pressure sensor 500_3 and the display circuit board 310 may have different rigidities. For example, the display circuit board 310 may be more rigid than the pressure sensor 500_3, but the present disclosure is not limited thereto.

According to the exemplary embodiments, in response to pressure being applied to the display device 10 in the opposite direction of the third direction (i.e., in the opposite direction of the Z-axis direction), the first pressure sensing layer PSL1 may be placed in contact with the first driving electrode TE1 and the first sensing electrode RE1 and may thus be able to detect pressure. Even when the pressure sensor 500_3 is neither in contact with, nor fixed to, the middle frame 600, the pressure sensor 500_3 can detect pressure applied to the display device 10 because the bottom surface of the pressure sensor 500_3 is attached and fixed to the display circuit board 310. Accordingly, damage to, and the malfunction of, the pressure sensor 500_3 that may be caused by mechanical tolerances, processing error, and the like when the pressure sensor 500_3 is in contact with, and fixed to, the panel bottom member 400 and the middle frame 600 can be prevented or reduced.

Although certain exemplary embodiments and implementations have been described herein, other exemplary embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
  a display panel;
  a pressure sensor disposed below the display panel, the pressure sensor configured to detect pressure applied to the display panel;
  a supporting layer disposed on a surface of the pressure sensor facing away from the display panel; and
  a middle frame disposed below the pressure sensor, the middle frame comprising a receiving groove, which corresponds to the pressure sensor and the supporting layer,
  wherein the middle frame comprises a bottom surface, a recessed bottom surface recessed from the bottom surface, and side surfaces disposed between the bottom surface and the recessed bottom surface,
  wherein the recessed bottom surface of the middle frame and the side surfaces of the middle frame define the receiving groove, and
  wherein the side surfaces of the middle frame overlap the display panel in a first direction perpendicular to the recessed bottom surface of the middle frame.

2. The display device of claim 1, wherein the pressure sensor is thicker than the supporting layer.

3. The display device of claim 1, wherein the supporting layer has a thickness of 10 μm to 500 μm.

4. The display device of claim 1, wherein the pressure sensor has a thickness of 50 μm to 250 μm.

5. The display device of claim 1, wherein the supporting layer is more rigid than the pressure sensor.

6. The display device of claim 1, further comprising:
  a panel bottom member disposed between the display panel and the pressure sensor,
  wherein a first surface of the pressure sensor is attached to the panel bottom member.

7. The display device of claim 6, wherein the receiving groove overlaps with the pressure sensor and the supporting layer in the first direction.

8. The display device of claim 7, wherein
  the supporting layer is spaced apart from the recessed bottom surface in the first direction.

9. The display device of claim 8, where a distance between the supporting layer and the recessed bottom surface is 0.1 mm to 0.4 mm.

10. The display device of claim 9, wherein
  the pressure sensor comprises first and second sensing cells, and
  the supporting layer is disposed to overlap at least one of the first and second sensing cells.

11. The display device of claim 10, wherein the pressure sensor comprises:
  a first substrate and a second substrate;
  a first driving electrode a second driving electrode, a first sensing electrode, and a second sensing electrode disposed on a first surface of the first substrate facing the second substrate;
  a first pressure sensing layer disposed on a first surface of the second substrate facing the first substrate; and
  a second pressure sensing layer contacting with the second driving electrode and the second sensing electrode,
  wherein the first pressure sensing layer overlaps with the first driving electrode and the first sensing electrode, and
  wherein gaps are formed between the first pressure sensing layer and the first driving electrode and between the first pressure sensing layer and the first sensing electrode.

12. The display device of claim 11, wherein the second pressure sensing layer is disposed on at least one side of the second driving electrode and on at least one side of the second sensing electrode.

13. The display device of claim 12, further comprising:
  a waterproof member disposed between the middle frame and the panel bottom member,
  wherein the waterproof member is disposed along edges of the middle frame and is in contact with the middle frame and the panel bottom member.

14. The display device of claim 1, wherein the pressure sensor comprises first and second sensing cells, the first cell is configured to detect a resistance variation caused by pressure, and the second sensing cell is configured to detect a resistance variation caused by temperature.

15. A display device comprising:
  a display panel;
  a pressure sensor disposed below the display panel;
  a middle frame disposed below the pressure sensor; and
  a display circuit board attached to one side of the display panel and bent toward a bottom of the display panel to be settled in a middle frame,
  wherein the pressure sensor is disposed between the display panel and the display circuit board,
  wherein a first surface of the pressure sensor is attached to the display circuit board,
  wherein the middle frame comprises a receiving groove, which corresponds to the display circuit board and the pressure sensor,
  wherein the middle frame comprises a bottom surface, a recessed bottom surface recessed from the bottom surface and side surfaces disposed between the bottom surface and the recessed bottom surface, wherein the recessed bottom surface of the middle frame and the side surfaces of the middle frame define the receiving groove, and
  wherein at least a portion of the side surfaces of the middle frame overlaps the display panel in a first direction perpendicular to the recessed bottom surface of the middle frame.

16. The display device of claim 15,
  wherein the display circuit board is spaced apart from the recessed bottom surface in the first direction.

17. The display device of claim 16, further comprising:
  a panel bottom member disposed between the display panel and the pressure sensor,
  wherein a second surface of the pressure sensor is attached to the panel bottom member.

18. The display device of claim 17, wherein the pressure sensor comprises;
  a first substrate and a second substrate;
  a first driving electrode, a second driving electrode, a first sensing electrode, and a second sensing electrode disposed on a first surface of the first substrate facing the second substrate;

a first pressure sensing layer disposed on a first surface of the second substrate facing the first substrate; and a second pressure sensing layer contacting with the second driving electrode and the second sensing electrode, wherein the first pressure sensing layer overlaps with the first driving electrode and the first sensing electrode, and wherein gaps are formed between the first pressure sensing layer and the first driving electrode and between the first pressure sensing layer and the first sensing electrode.

19. The display device of claim 18, wherein the second pressure sensing layer is disposed on at least one side of the second driving electrode and on at least one side of the second sensing electrode.

* * * * *